United States Patent
Yamauchi et al.

(10) Patent No.: US 9,565,049 B2
(45) Date of Patent: Feb. 7, 2017

(54) COMMUNICATION APPARATUS, COMMUNICATION METHOD, AND COMPUTER PRODUCT FOR SHARING DATA

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 745 days.

(21) Appl. No.: 13/724,949

(22) Filed: Dec. 21, 2012

(65) Prior Publication Data

US 2013/0117347 A1     May 9, 2013

Related U.S. Application Data

(63) Continuation of application No. PCT/JP2010/060687, filed on Jun. 23, 2010.

(51) Int. Cl.
   *G06F 15/16*      (2006.01)
   *H04L 29/02*     (2006.01)
   *G06F 12/14*     (2006.01)

(52) U.S. Cl.
   CPC ........... *H04L 29/02* (2013.01); *G06F 12/1416* (2013.01); *Y02B 60/1225* (2013.01)

(58) Field of Classification Search
   CPC ... G06F 12/1416; H04L 29/02; Y02B 60/1225
   USPC .................. 709/201–203, 217–219, 245–246
   See application file for complete search history.

(56) References Cited

U.S. PATENT DOCUMENTS

| | | | |
|---|---|---|---|
| 7,516,242 B2* | 4/2009 | Furukawa | H04L 12/2854 709/245 |
| 7,519,363 B2* | 4/2009 | Shin | H04L 29/06 370/331 |
| 7,779,187 B2* | 8/2010 | Ikeda et al. | 710/309 |
| 2001/0003839 A1 | 6/2001 | Kondo | |

(Continued)

FOREIGN PATENT DOCUMENTS

| | | |
|---|---|---|
| JP | 10-214259 A | 8/1998 |
| JP | 11-066022 A | 3/1999 |

(Continued)

OTHER PUBLICATIONS

Chinese Office Action issued Oct. 22, 2014 in corresponding Chinese Patent Application No. 201080067646.1, with partial translation.

*Primary Examiner* — Bharat N Barot
(74) *Attorney, Agent, or Firm* — Arent Fox LLP

(57) ABSTRACT

A communication apparatus includes a processor configured to access memory of the communication apparatus; communicate with a second apparatus; detect an access request generated by the communication apparatus; determine whether an address of access targeted data indicated in the detected access request is an address allocated to the memory of the communication apparatus; and perform control for selecting and executing based on a determination result, any one among a process of accessing the memory of the communication apparatus based on the access request and a process of communicating with the second apparatus based on the access request.

9 Claims, 22 Drawing Sheets

(56) References Cited

U.S. PATENT DOCUMENTS

| | | | |
|---|---|---|---|
| 2001/0014933 A1* | 8/2001 | Shibazaki | G06F 12/02 |
| | | | 711/154 |
| 2004/0205147 A1 | 10/2004 | Fukuzato | |
| 2007/0162628 A1* | 7/2007 | Terashima et al. | 710/8 |
| 2007/0255784 A1* | 11/2007 | Takechi | H04L 67/14 |
| | | | 709/203 |
| 2008/0095089 A1* | 4/2008 | Nishiyama | H04W 74/04 |
| | | | 370/311 |
| 2008/0165682 A1* | 7/2008 | Ishiyama | H04L 29/06 |
| | | | 370/230 |
| 2009/0089357 A1* | 4/2009 | Murray | G06Q 20/02 |
| | | | 709/201 |
| 2009/0204751 A1 | 8/2009 | Kushita | |
| 2011/0004651 A1* | 1/2011 | Tuli | G04G 21/08 |
| | | | 709/203 |

FOREIGN PATENT DOCUMENTS

| | | |
|---|---|---|
| JP | 11-203184 A | 7/1999 |
| JP | 2001-167007 A | 6/2001 |
| JP | 2001-325007 A | 11/2001 |
| JP | 2004-260274 A | 9/2004 |
| JP | 2008-250572 A | 10/2008 |
| JP | 2008-305201 A | 12/2008 |
| WO | WO 2008/001671 A1 | 1/2008 |

\* cited by examiner

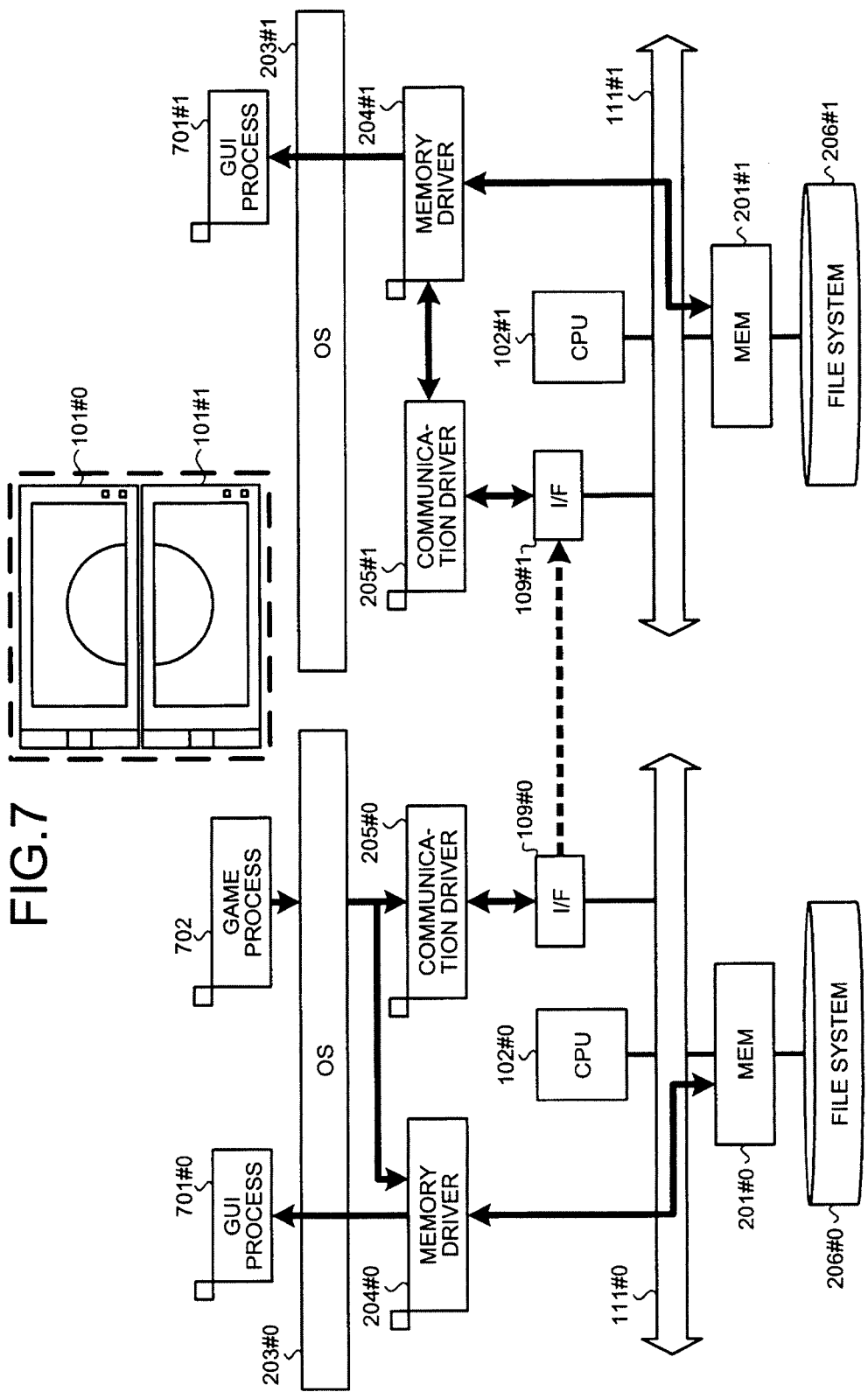

FIG.8

| EVENT ID | EVENT PROCESS |
| --- | --- |
| 0 | WIRELESS CONNECTION REQUEST |
| 1 | NOTIFICATION RELATED TO DISCONNECTION OF WIRELESS CONNECTION |
| 2 | NOTIFICATION RELATED TO READ INSTRUCTION WHEN ADDRESS OF ACCESS DESTINATION IS OUT OF RANGE OF PHYSICAL ADDRESSES OF APPARATUS |
| 3 | NOTIFICATION RELATED TO WRITE INSTRUCTION WHEN ADDRESS OF ACCESS DESTINATION IS OUT OF RANGE OF PHYSICAL ADDRESSES OF APPARATUS |
| 4 | WIRELESS CONNECTION REQUEST FOR DISTRIBUTED PROCESSING |
| 5 | NOTIFICATION OF UPDATED VALUE VIA COMMUNICATION DRIVER TO OTHER APPARATUS AFTER WRITE ACCESS TO DATA SPECIFIC TO APPARATUS |
| 6 | TRANSFER REQUEST FOR OBJECT DATA TO OTHER APPARATUS VIA COMMUNICATION DRIVER |
| 7 | TRANSMISSION OF I/O LOG |

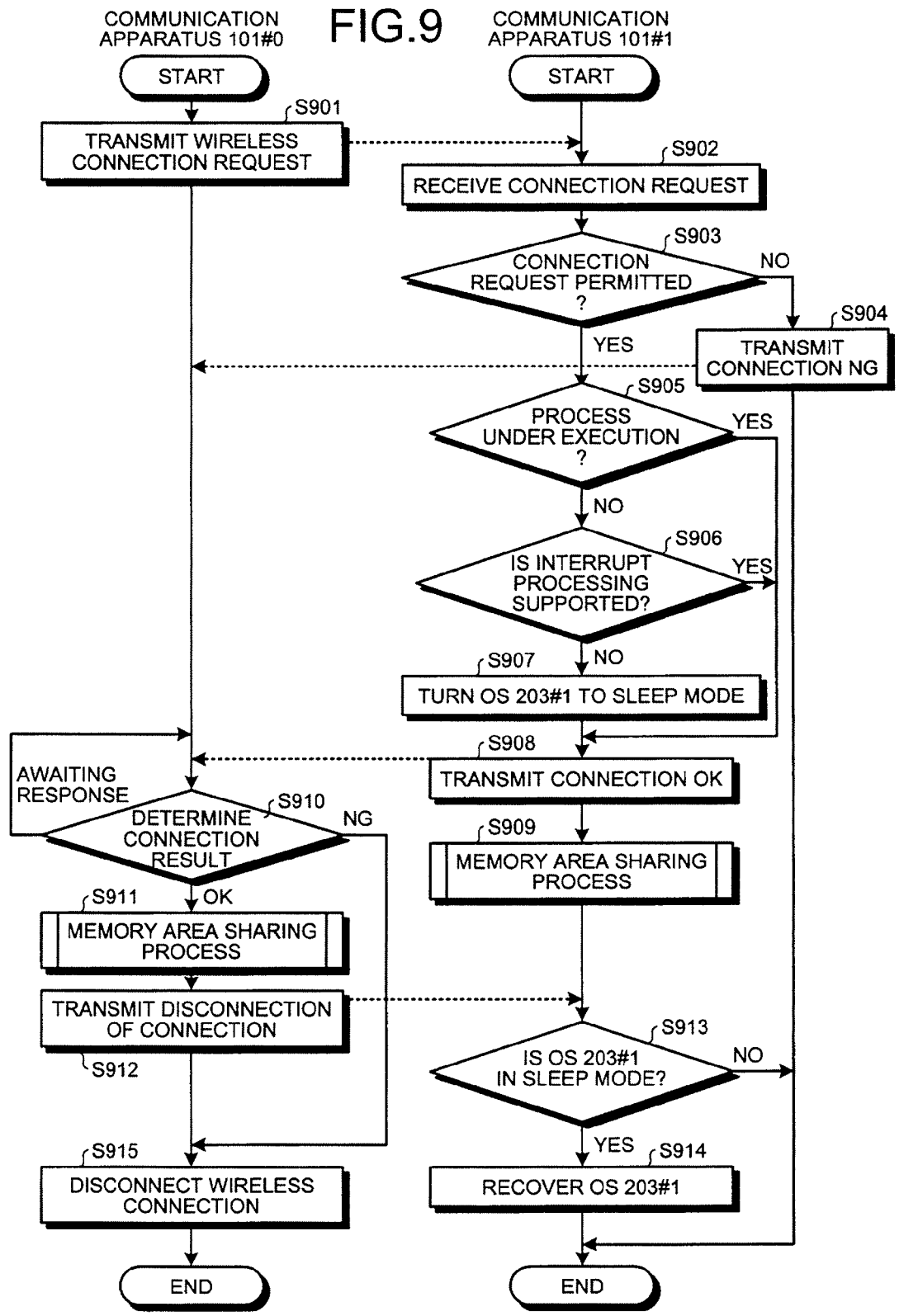

FIG.17

| VIRTUAL ADDRESS | VALUE |
|---|---|
| 0x12345678 | 0 |
| 0x23456789 | 1 |
| 0x34567890 | 2 |

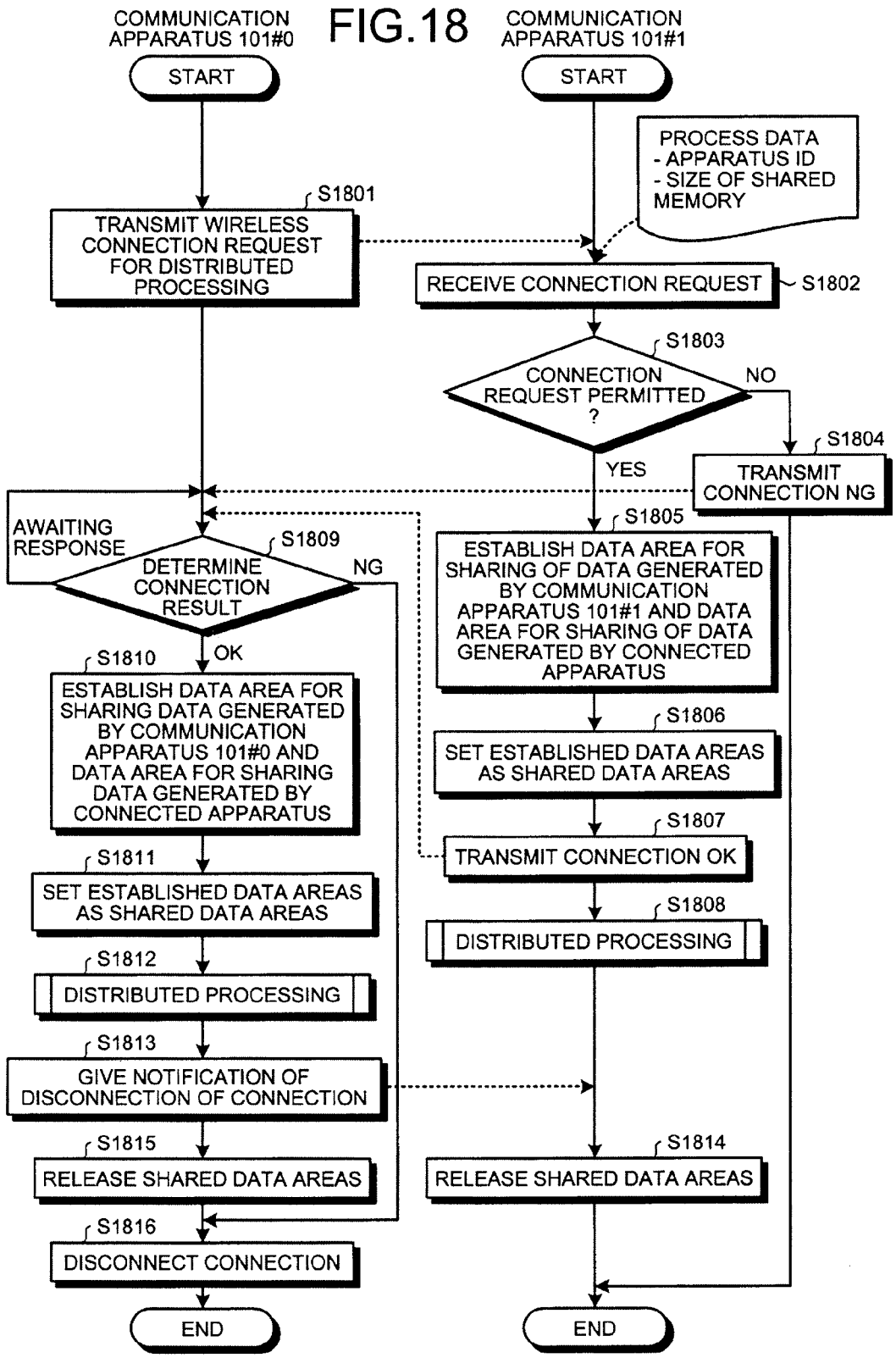

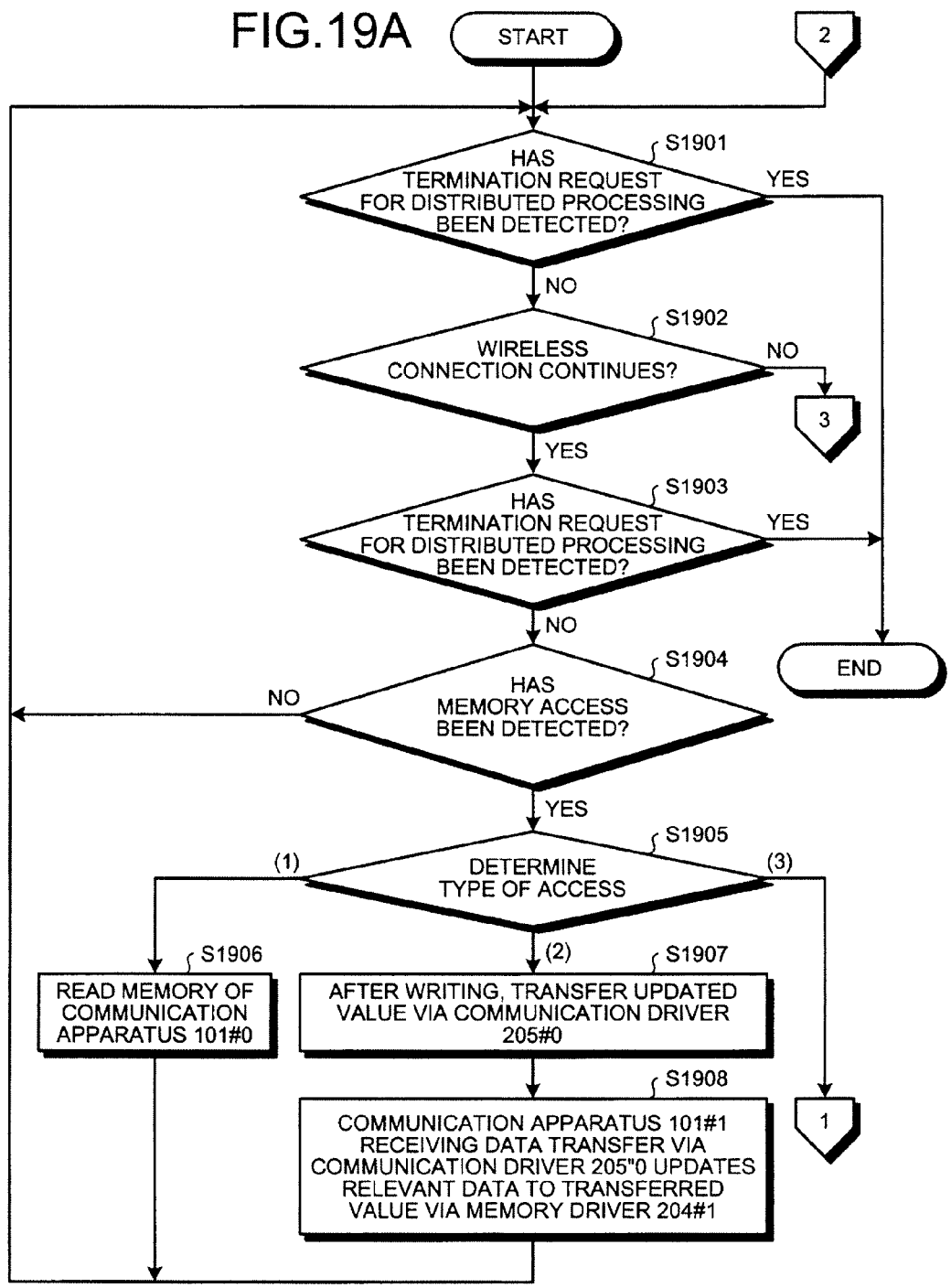

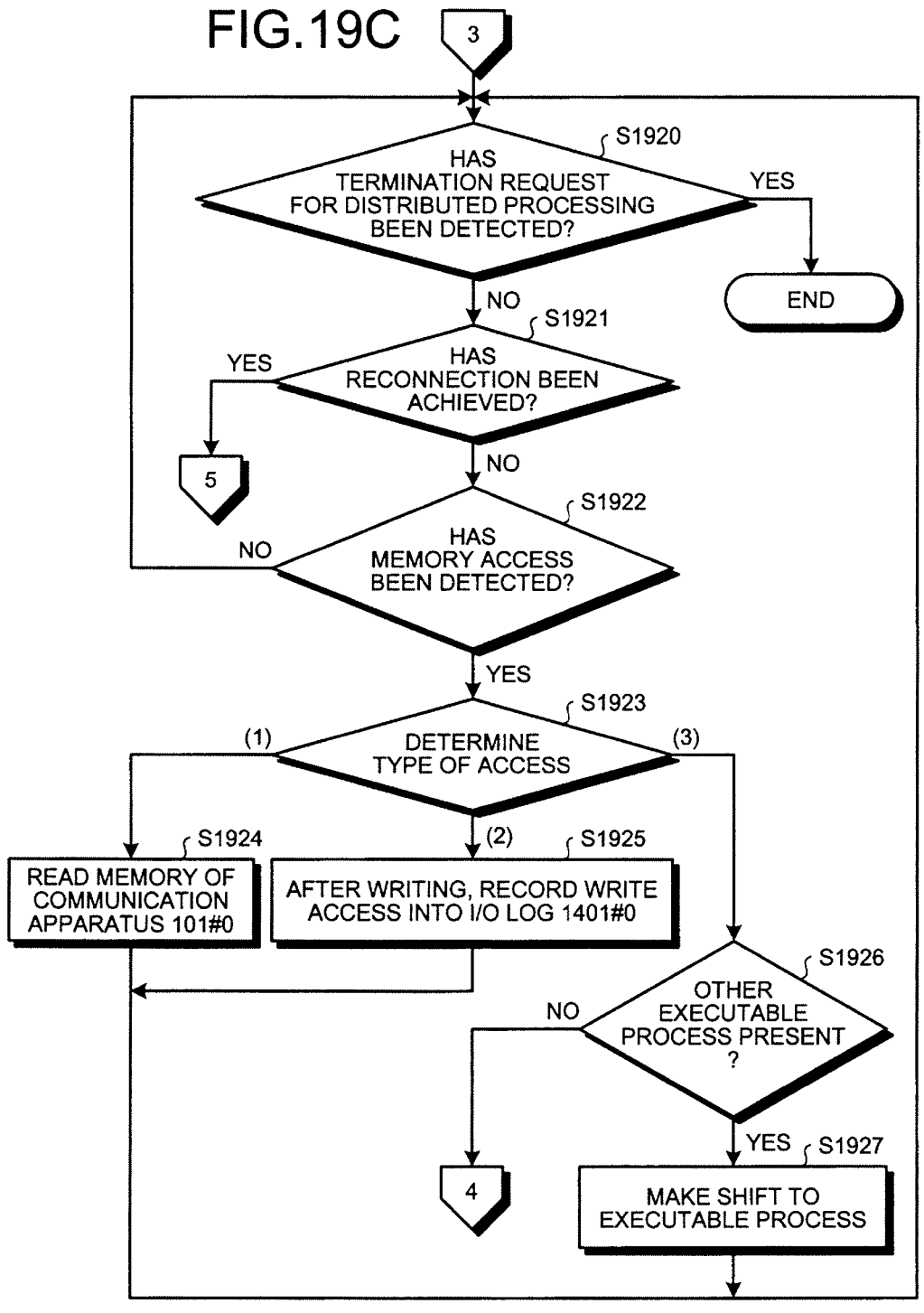

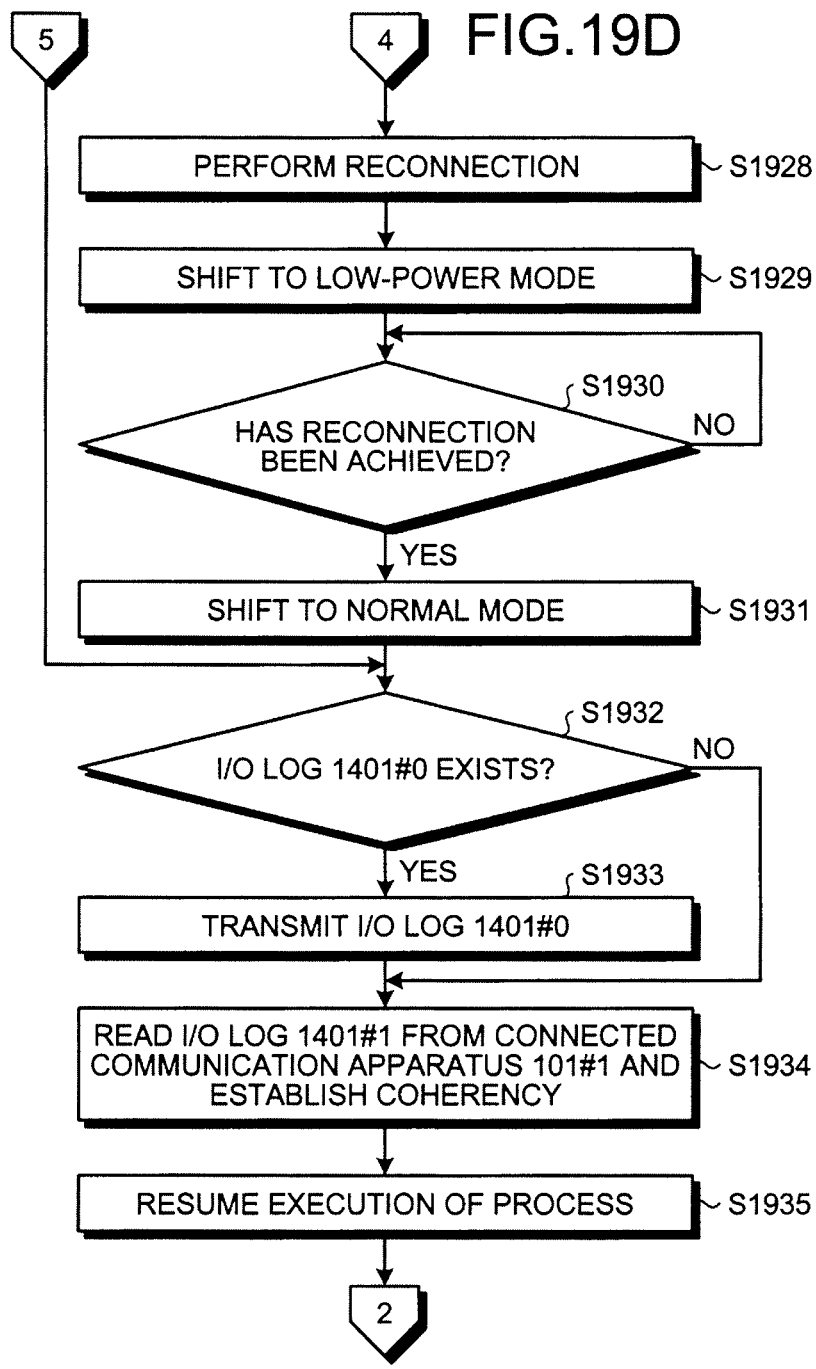

COMMUNICATION APPARATUS, COMMUNICATION METHOD, AND COMPUTER PRODUCT FOR SHARING DATA

CROSS REFERENCE TO RELATED APPLICATIONS

This application is a continuation application of International Application PCT/JP2010/060687, filed on Jun. 23, 2010 and designating the U.S., the entire contents of which are incorporated herein by reference.

FIELD

The embodiments discussed herein are related to a communication apparatus, a communication method, and a computer product for performing communication.

BACKGROUND

A technique conventionally exists that executes distributed processing while sharing data among terminal apparatuses such as portable apparatuses. For example, a technique of sharing data among multiple apparatuses is disclosed that connects, for example, a server side terminal and a portable terminal, acting as a client, through a wireless connection to share data so as to efficiently utilize a limited storage area in the portable terminal (see, e.g., Japanese Laid-Open Patent Publication No. 2004-260274).

Another technique is disclosed that realizes the sharing of a data file without making a disclosure request to reduce the burden placed on the user for sharing data when data is shared by portable terminals (see, e.g., Japanese Laid-Open Patent Publication No. 2008-250572).

In another disclosed technique, for example, when program code is transferred to another core, a classification for determining whether data is transferred is given so that a startup time of a program is shortened by transmitting program code requested at the time of startup (see, e.g., Published Japanese-Translation of PCT Application, Publication No. WO2008/001671).

For a technique of controlling the transfer of data to be shared, for example, a technique is disclosed that additionally allocates available space within an area of a distributed shared memory to an area significantly lacking distributed shared memory (see, e.g., Japanese Laid-Open Patent Publication No. 2008-305201).

With regard to a method of distributing data to multiple apparatuses, a technique is disclosed that causes a server to terminate data distribution to multiple control apparatuses when a line or an apparatus has a failure and to resume the data distribution at the normal time or at regular intervals (see, e.g., Japanese Laid-Open Patent Publication No. 2001-325007).

However, since a file is formed when communication is performed in each of the techniques above, if small-sized data is frequently communicated, the file formation and deployment processing problematically causes overhead in the distributed processing.

SUMMARY

According to an aspect of an embodiment, a communication apparatus includes a processor configured to access memory of the communication apparatus; communicate with a second apparatus; detect an access request generated by the communication apparatus; determine whether an address of access targeted data indicated in the detected access request is an address allocated to the memory of the communication apparatus; and perform control for selecting and executing based on a determination result, any one among a process of accessing the memory of the communication apparatus based on the access request and a process of communicating with the second apparatus based on the access request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is an explanatory view of execution of a game application in the communication system 100 according to the first embodiment;

FIG. 8 is an explanatory view of an example of storage contents of an event table 801;

FIG. 9 is a flowchart of a memory area sharing start process and a memory area sharing end process according to the first embodiment;

FIG. 17 is an explanatory view of an example of an I/O log according to the second embodiment;

FIG. 18 is a flowchart of a distribution start process and a distribution end process according to the second embodiment;

FIG. 19A is a first flowchart of distributed processing;

FIG. 19C is a third flowchart of the distributed process; and

FIG. 19D is a fourth flowchart of the distributed processing.

DESCRIPTION OF EMBODIMENTS

Preferred embodiments of a communication apparatus, a communication method, and a communication program according to the present invention will now be described in detail with reference to the accompanying drawings.

Figure 1:
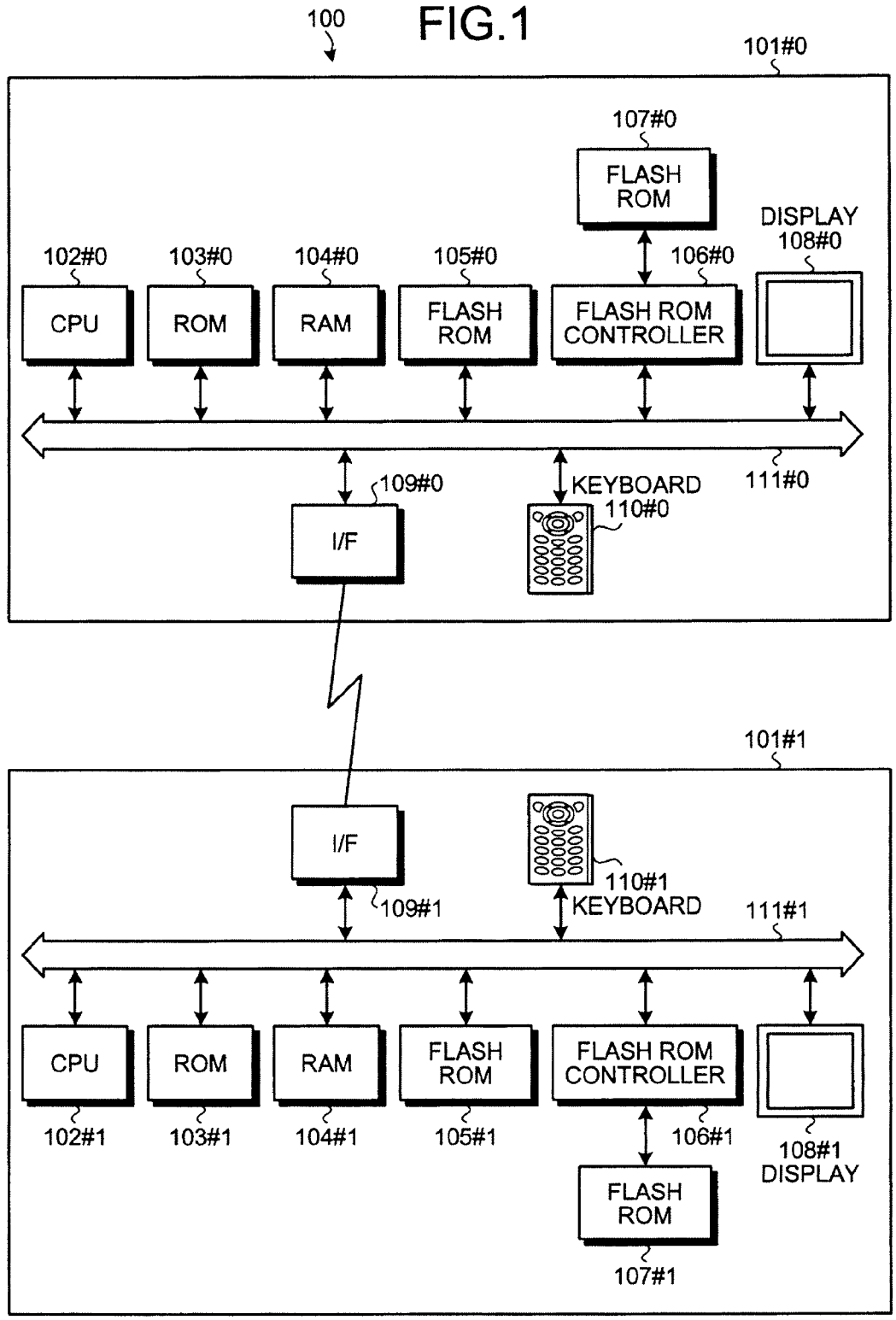
FIG. 1 is a block diagram of hardware of a communication system 100 according to an embodiment.

FIG. 1 is a block diagram of hardware of a communication system 100 according to an embodiment. In FIG. 1, the communication system 100 includes a communication apparatus 101#0 and a communication apparatus 101#1. An example of the communication apparatus 101 may be a small-sized portable terminal apparatus. The communication apparatus 101#0 includes a CPU 102#0, a read-only memory (ROM) 103#0, and a random access memory (RAM) 104#0. The communication apparatus 101#0 includes a flash ROM 105#0, a flash ROM controller 106#0, and a flash ROM 107#0. The communication apparatus 101#0 includes a display 108#0, an interface (I/F) 109#0, and a keyboard 110#0 as input/output devices for a user or other equipment. These units are connected through a bus 111#0, respectively.

The communication apparatus 101#1 includes the same hardware as the communication apparatus 101#0. For example, the communication apparatus 101#1 includes a CPU 102#1, a ROM 103#1, a RAM 104#1, and a bus 111#1. The communication apparatus 101#1 may include a flash ROM 105#1, a flash ROM controller 106#1, a flash ROM 107#1, a display 108#1, an I/F 109#1, and a keyboard 110#1.

The flash ROM 105 to the display 108 and the keyboard 110 may be included in either the communication apparatus 101#0 or the communication apparatus 101#1. For example, the communication apparatuses may be formed such that the communication apparatus 101#0 includes the display 108#0 while the communication apparatus 101#1 includes the flash ROM 105#1 to the flash ROM 107#1 and the keyboard 110#1. Alternatively, the communication apparatuses may be formed such that both the communication apparatus 101#0 and the communication apparatus 101#1 include certain hardware while either one includes the flash ROM 105#1 to the display 108#0 and the keyboard 110#1 other than the certain hardware.

For example, the communication apparatus 101#0 and the communication apparatus 101#1 may be independent portable terminal apparatuses handled as a set of two apparatuses. In the case of the independent portable terminal apparatuses, the communication apparatuses may be formed such that the communication apparatus 101#0 includes the display 108#0 having a touch panel function while the communication apparatus 101#1 includes the keyboard 110#1.

Although the hardware in the communication apparatus 101#0 will hereinafter be described, the hardware in the communication apparatus 101#1 has functions equivalent to the hardware in the communication apparatus 101#0.

The CPU 102#0 is responsible for overall control of the communication apparatus 101#0. The CPU 102#0 may be a multicore processor including multiple CPUs. A multicore processor system is a system of a computer including a processor equipped with multiple cores.

The ROM 103#0 stores programs such as a boot program. The RAM 104#0 is used as a work area of the CPU 102#0. The flash ROM 105#0 stores system software, such as an operating system (OS), and application software. For example, when the OS is updated, the communication apparatus 101#0 receives a new OS through the I/F 109#0 and updates the old OS stored in the flash ROM 105#0 with the received new OS.

The flash ROM controller 106#0 controls the reading and writing of data with respect to the flash ROM 107#0, under the control of the CPU 102#0. The flash ROM 107#0 stores data written under the control of the flash ROM controller 106#0. Examples of data include image data and video data acquired through the I/F 109#0 by a user using the communication apparatus 101#0. For example, a memory card and an SD card may be employed as the flash ROM 107#0.

The display 108#0 displays a cursor, icons, or tool boxes as well as data such as documents, images, and functional information. For example, a TFT liquid crystal display may be employed as the display 108#0.

The I/F 109#0 directly communicates with the communication apparatus 101#1 through ad-hoc communication, which is a wireless LAN communication mode. The I/F 109#0 may be connected through a communication line to a network such as a local area network (LAN), a wide area network (WAN), and the Internet and may be connected via the network to another apparatus. The I/F 109#0 is responsible for a network and an internal interface and controls the input and output of data with respect to an external apparatus. For example, a modem or a LAN adapter may be employed as the I/F 109#0. Although a communication method in this embodiment is preferably assumed as wireless communication, data may be input/output from/to another apparatus by wire.

The keyboard 110#0 has keys for entering numeric characters, various instructions, etc., to input data. The keyboard 110#0 may be a touch panel input pad or a numerical keypad.

Figure 2:
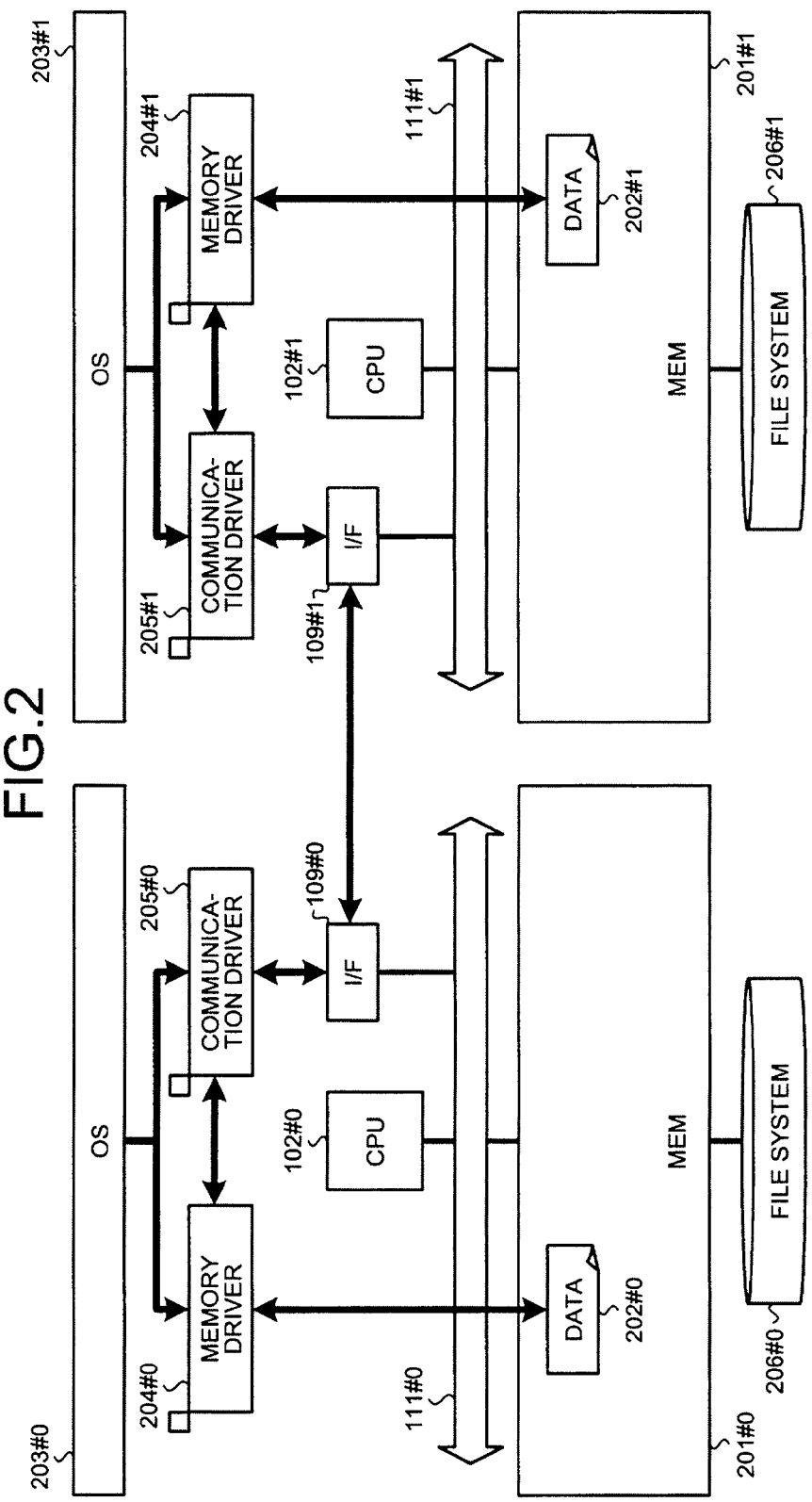
FIG. 2 is an explanatory view of general operation of the communication system 100 according to a first embodiment.

FIG. 2 is an explanatory view of general operation of the communication system 100 according to a first embodiment. The CPU 102#0 controlling the communication apparatus 101#0 stores data 202#0 into memory (MEM) 201#0 via the bus 111#0. The MEM 201#0 is a storage device such as a RAM used as a work area of the CPU 102#0 and is hardware such as the RAM 104#0, for example. The communication apparatus 101#0 executes an OS 203#0, a memory driver 204#0, a communication driver 205#0, and a file system 206#0 as software.

The OS 203#0 is a program controlling the communication apparatus 101#0. For example, the OS 203#0 provides drivers used by application software. The OS 203#0 provides a file system 206#0 to application software for access to the flash ROM 107 etc., acting as an auxiliary storage device.

The memory driver 204#0 is one of the drivers provided by the OS 203#0 and has a function of accessing the MEM 201#0. The communication driver 205#0 is one of the drivers provided by the OS 203#0 and has a function of communicating with the communication apparatus 101#1, via the I/F 109#0.

The file system 206#0 is a functions provided by the OS 203#0 and has a function of accessing a file that is data stored in the flash ROM 105#0, the flash ROM 107#0, etc. acting as an auxiliary storage device. For example, a file stored in the flash ROM 107 is read by the CPU 102#0 into the RAM 104#0. The data updated by the CPU 102#0 is written into the flash ROM 107#0 as a file.

In the communication apparatus 101#1, the CPU 102#1 controlling the communication apparatus 101#1 stores data 202#1 via the bus 111#1 into a MEM 201#1. The communication apparatus 101#1 includes the same software as the communication apparatus 101#0. Therefore, the communication apparatus 101#1 executes an OS 203#1, a memory driver 204#1, a communication driver 205#1, and a file system 206#1 as software.

The communication system 100 utilizes the software described above to share data. For example, the OS 203#0 detects an access request for the data 202#0 generated by the software of the communication apparatus 101#0 and determines whether an access destination of the data 202#0 is the MEM 201#0. In the example of FIG. 2, the data 202#0 is stored in the MEM 201#0 and therefore, the OS 203#0 provides control such that the memory driver 204#0 accesses the data.

If an access request for the data 202#1 is detected in the communication apparatus 101#0, the OS 203#0 determines whether the access destination for the data 202#1 is the MEM 201#0. In the example of FIG. 2, the data 202#1 is not stored in the MEM 201#0 and therefore, the OS 203#0 communicates a signal based on the access request through the communication driver 205#0 to the communication apparatus 101#1. The communication apparatus 101#1 receives the signal from the communication driver 205#0 and accesses the data 202#1 stored in the MEM 201#1, via the memory driver 204#1.

As described, the communication apparatus 101#0 and the communication apparatus 101#1 connected through wireless communication can access the memory of the connected apparatus via the communication driver 205#0 or the communication driver 205#1 to execute distributed processing while sharing data. In the case of a communication system according to a conventional example, the file formation processing is present before going through the communication driver 205#0 or the communication driver 205#1. The communication system 100 according to the first embodiment does not execute the file processing and can therefore execute the communication processing without the overhead associated with the file processing.

Figure 3:
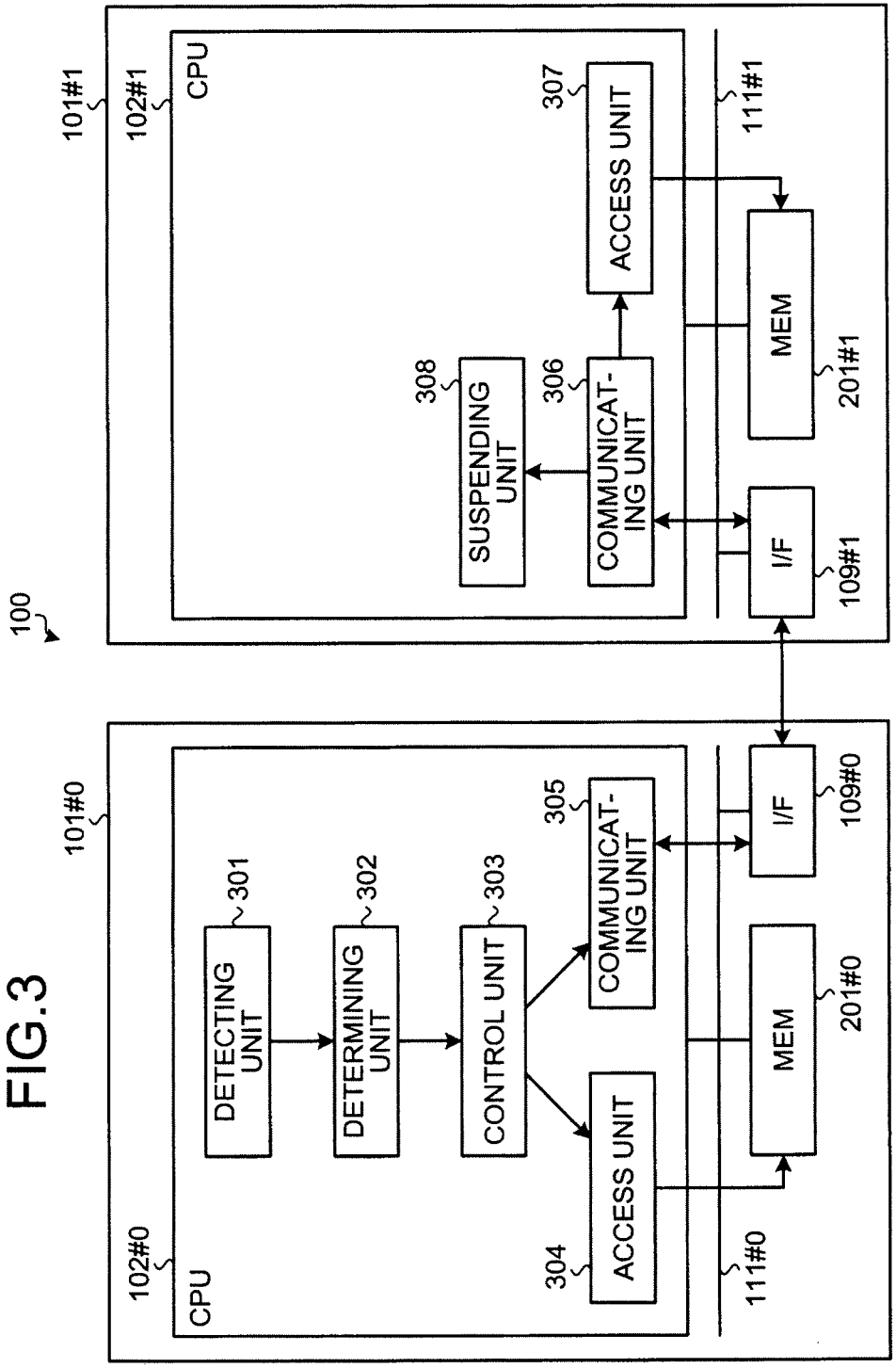
FIG. 3 is a functional diagram of the communication system 100 according to the first embodiment.

Functions of the communication system 100 according to the first embodiment will be described. FIG. 3 is a functional diagram of the communication system 100 according to the first embodiment. The communication system 100 according to the first embodiment includes a detecting unit 301, a determining unit 302, a control unit 303, an access unit 304, a communicating unit 305, a communicating unit 306, an access unit 307, and a suspending unit 308.

The functions (the detecting unit 301 to the suspending unit 308) acting as a control unit are implemented by the CPU 102#0 and the CPU 102#1 executing programs stored in storage devices. The storage devices are, for example, the ROM 103, the RAM 104, the flash ROM 105, and the flash ROM 107 depicted in FIG. 1. Alternatively, programs may be acquired via the I/F 109#0 and the CPU 102#0 and the CPU 102#1 may execute the acquired programs to implement the functions.

Although the detecting unit 301 to the communicating unit 305 are included among the functions of the communication apparatus 101#0 and the communicating unit 306 to the suspending unit 308 are included among the functions of the communication apparatus 101#1 in the state depicted in FIG. 3, the detecting unit 301 to the communicating unit 305 may be included among the functions of the communication apparatus 101#1. Similarly, the communicating unit 306 to the suspending unit 308 may be included in the functions of the communication apparatus 101#0.

The detecting unit 301 has a function of detecting an access request generated by the communication apparatus implementing the detecting unit 301. The access request may be a read request or a write request. For example, the detecting unit 301 detects an access request generated by a process being executed in the communication apparatus 101#0. The information of the detected access request is stored into a register of the CPU executing the detecting unit 301 and a storage area such as a memory. For example, if the detecting unit 301 is executed in the communication apparatus 101#0, the information of the detected access request is stored into a register of the CPU 102#0 and the MEM 201#0.

The determining unit 302 has a function of determining whether an address of access targeted data indicated in an access request detected by the detecting unit 301 is an address allocated to a memory of the communication apparatus implementing the determining unit 302.

For example, the determining unit 302 determines whether an address of access targeted data in an access request is an address allocated to the MEM 201#0 of the communication apparatus 101#0. For example, it is assumed that a range of addresses in the MEM 201#0 is from 0x00000000 to 0x1fffffff.

If the address of access targeted data in an access request is 0x00001000, the address of the access targeted data is within the range of addresses of the MEM 201#0 and therefore, the determining unit 302 determines that the address is an address allocated to a memory of the communication apparatus implementing the determining unit 302. If the address of access targeted data in an access request is 0x20001000, the address of the access targeted data is out of the range of addresses of the MEM 201#0 and therefore, the determining unit 302 determines that the address is not an address allocated to a memory of the communication apparatus implementing the determining unit 302.

The determination result is stored into a register of the CPU executing the determining unit 302 and a storage area such as a memory. For example, if the determining unit 302 is executed in the communication apparatus 101#0, the determination result is stored into the register of the CPU 102#0 and the MEM 201#0.

The control unit 303 has a function of selecting and executing either the process of the access unit 304 or the process of the communicating unit 305 based on the determination result obtained by the determining unit 302. If the process of the access unit 304 is selected, the control unit 303 drives the access unit 304 to access the memory of the communication apparatus implementing the access unit 304, based on the access request. If the process of the communicating unit 305 is selected, the control unit 303 drives the communicating unit 305 to communicate with another apparatus, based on the access request.

For example, if the determining unit 302 determines that the access request is to an address allocated to the MEM 201#0, the control unit 303 selects the process of the access unit 304 and drives the access unit 304 to access the MEM 201#0. If the determining unit 302 determines that the access request is not to an address allocated to the MEM 201#0, the control unit 303 selects the process of the communicating unit 305 to drive the communicating unit 305 to communicate with the communication apparatus 101#1 by using the I/F 109#0.

The access unit 304 has a function of accessing a memory of the communication apparatus implementing the access unit 304. For example, in the communication apparatus 101#0, the access unit 304 is the memory driver 204#0. A result of access is stored into a register of the CPU executing the access unit 304. For example, if the access unit 304 is the memory driver 204#0, the result is stored in the register of the CPU 102#0.

The communicating unit 305 has a function of communicating with another apparatus. For example, in the communication apparatus 101#0, the communicating unit 305 is the communication driver 205#0. A result of communication is stored into a register of the CPU executing the communicating unit 305 and a memory. For example, if the communicating unit 305 is the communication driver 205#0, the result is stored in the register of the CPU 102#0 and the MEM 201#0.

The communicating unit 306 included in the functions of the CPU 102#1 has a function equivalent to the communicating unit 305 and the access unit 307 has a function equivalent to the access unit 304. When receiving an access request from the communicating unit 305, the communicating unit 306 notifies the access unit 307 of the access request. The access unit 307 accepting the access request accesses the MEM 201#1 based on the access request.

The suspending unit 308 has a function of suspending an OS based on an execution state related to software being executed in the communication apparatus implementing the suspending unit 308, if the communicating unit 306 receives an access request. The software specified in this case includes a process and interrupt processing. For example, when the communicating unit 306 receives an access request, the suspending unit 308 puts the OS into a sleep mode if the communication apparatus 101#1 has no process under execution and does not support the interrupt processing.

Figure 4:
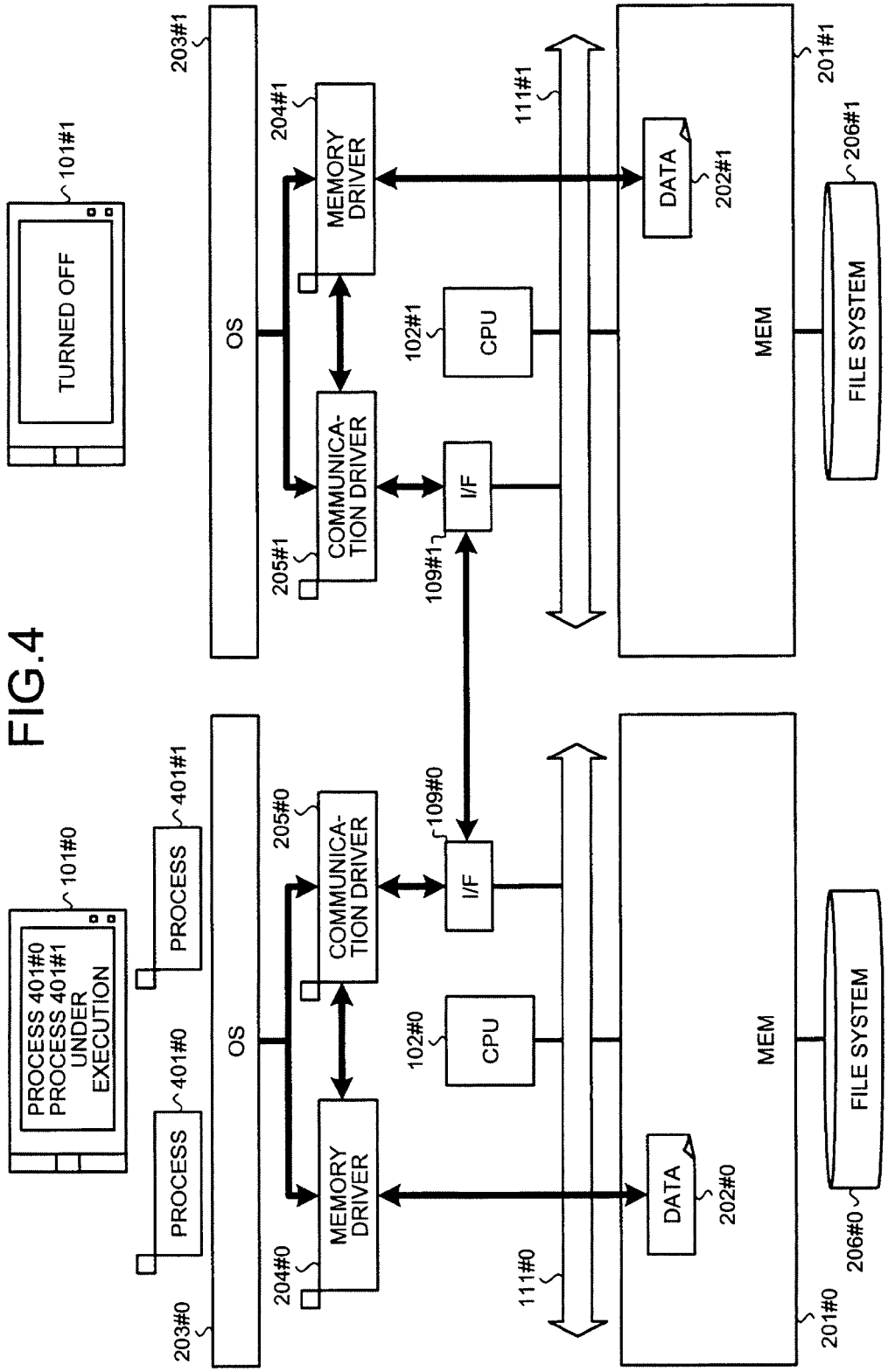
FIG. 4 is an explanatory view of a first operation in a memory area sharing process of the communication system 100 according to the first embodiment.

FIG. 4 is an explanatory view of a first operation in a memory area sharing process of the communication system 100 according to the first embodiment. The communication system 100 during the first operation is in a state of executing distributed processing in such a manner that the CPU 102#0 executes a process 401#0 and a process 401#1 while the CPU 102#1 executes no particular process. The display 108#0 of the communication apparatus 101#0 draws a screen from the process 401#0 or the process 401#1 and the display 108#1 of the communication apparatus 101#1 is turned off.

In the state of FIG. 4, the communication apparatus 101#0 and the communication apparatus 101#1 act as a master apparatus and a slave apparatus, respectively, and the master apparatus utilizes a memory area of the slave apparatus. For example, the communication apparatus 101#0 virtually handles the MEM 201#1, i.e., the memory area of the connected communication apparatus 101#1, as a memory area of the communication apparatus 101#0.

In a method of virtually handling the MEM 201#1 as a memory area of the communication apparatus 101#0, the communication apparatus 101#0 transmits an access instruction from the communication driver 205#0 for access to an address other than the MEM 201#0 and the communication apparatus 101#1 performs data access via the memory driver 204#1. As a result, since a memory area is virtually increased, data on a memory handled by a high-priority process can be prevented from being paged-out.

Figure 5:
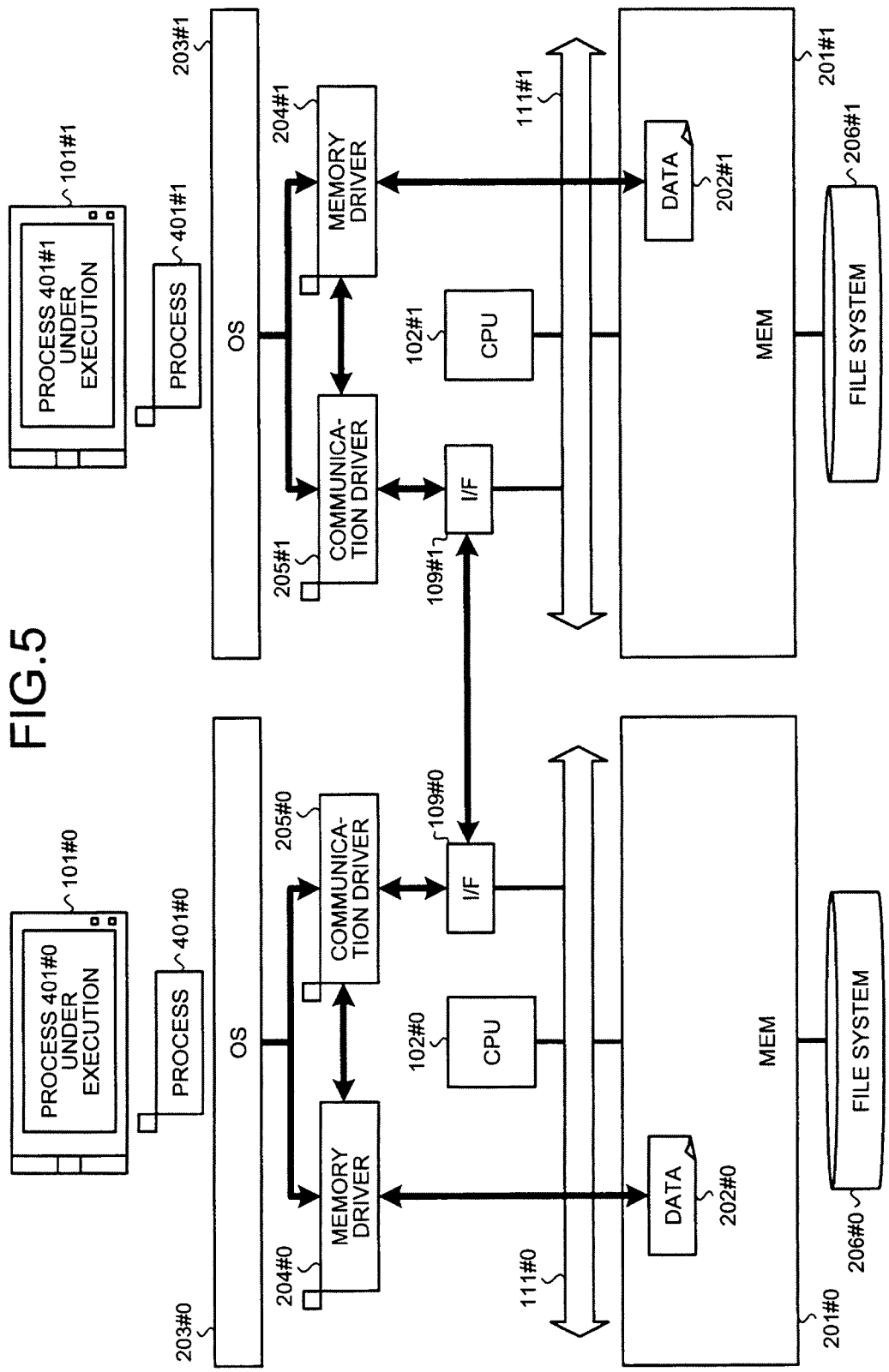
FIG. 5 is an explanatory view of a second operation in the memory area sharing process of the communication system 100 according to the first embodiment.

FIG. 5 is an explanatory view of a second operation in the memory area sharing process of the communication system 100 according to the first embodiment. The communication system 100 during the second operation is in a state of executing the distributed processing in such a manner that the CPU 102#0 executes the process 401#0 while the CPU 102#1 executes the process 401#1. The display 108#0 of the communication apparatus 101#0 draws a screen from the process 401#0 and the display 108#1 of the communication apparatus 101#1 draws a screen from the process 401#1. In the state of FIG. 5, the communication apparatus 101#0 and the communication apparatus 101#1 act as a master apparatus and a slave apparatus, respectively, and the master apparatus utilizes a memory area of the slave apparatus.

If the distributed processing is executed by multiple apparatuses in the communication system 100, an apparatus transmits an access instruction from the communication driver when an access destination of data is data in a connected apparatus. The other apparatus receiving the access instruction through the communication driver accesses the data via the memory driver and transmits the data again to the apparatus from the communication driver.

Figure 6:
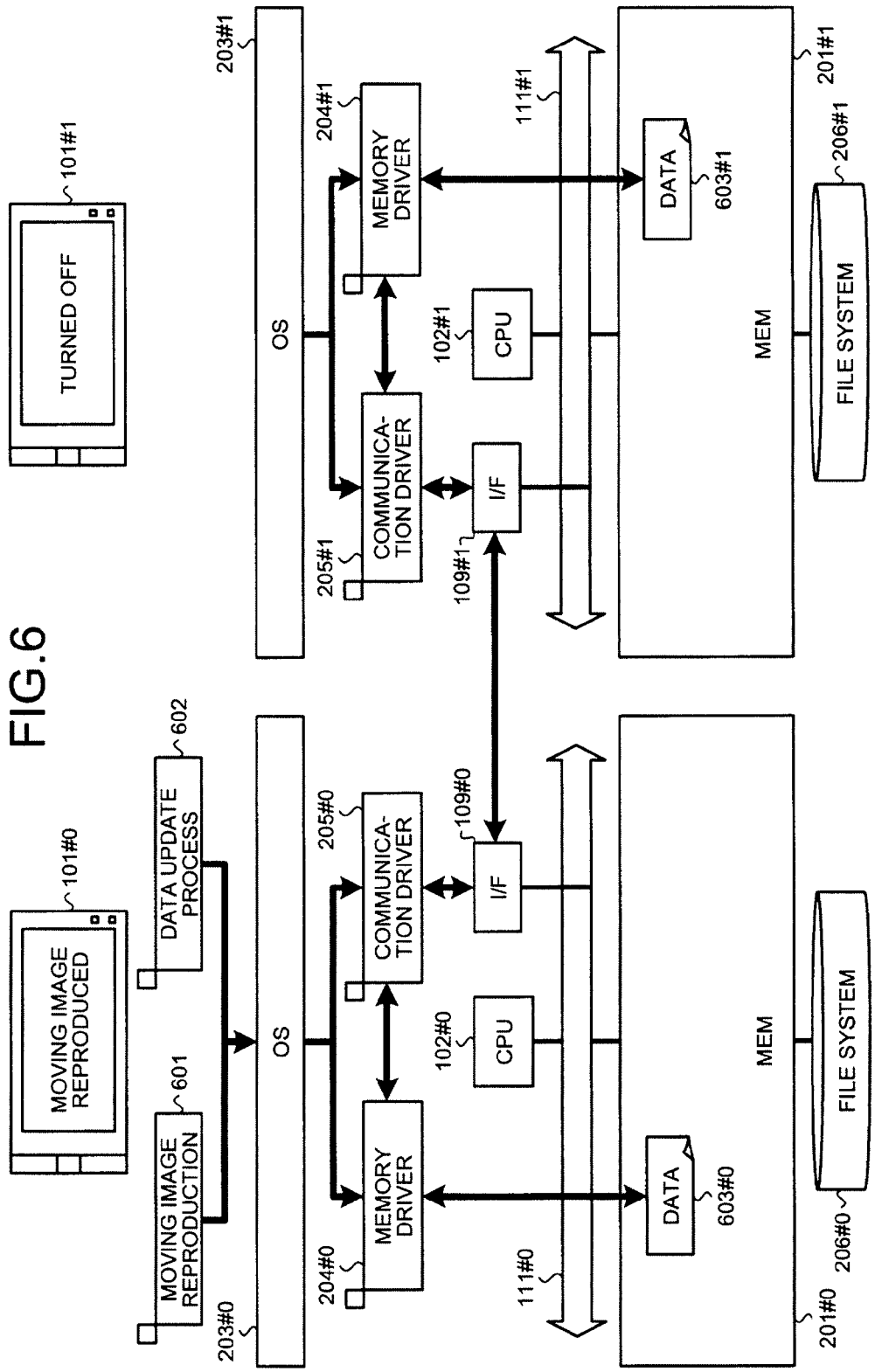
FIG. 6 is an explanatory view of reproduction of a moving image in the communication system 100 according to the first embodiment.

FIG. 6 is an explanatory view of reproduction of a moving image in the communication system 100 according to the first embodiment. The communication system 100 of FIG. 6 is in the first operation during the memory area sharing process depicted in FIG. 4 and the communication apparatus 101#0 executes a moving image reproduction process 601 and a data update process 602. The display 108#0 reproduces a moving image from the moving image reproduction process 601. High-speed processing is required for the moving image reproduction process 601 while high-speed processing is not required for the data update process 602, and the data updating may be operated in background.

In the state of FIG. 6, the communication apparatus 101#0 stores data 603#1 used by the data update process 602 into the MEM 201#1 to increase available space in the MEM 201#0. Therefore, the communication apparatus 101#0 can prevent the page-out of data 603#0 used by the moving image reproduction process 601 requiring high-speed processing. If the page-out occurs, the data 603#0 is stored in the file system 206#0 causing a slower access speed and therefore, the high-speed processing of the moving image reproduction process 601 is hindered.

FIG. 7 is an explanatory view of execution of a game application in the communication system 100 according to the first embodiment. The communication system 100 of FIG. 7 is in the second operation during the memory area sharing process depicted in FIG. 5 and the communication apparatus 101#0 executes a GUI process 701#0 and a game process 702 while the communication apparatus 101#1 executes a GUI process 701#1. In the state of FIG. 7, the communication apparatus 101#0 and the communication apparatus 101#1 can be defined as a master apparatus and a slave apparatus, respectively, to enable the game process 702 to recognize and display the display 108#0 and the display 108#1 as one screen.

If a drawing instruction is given for one screen in the game process 702, the OS 203#0 determines whether an object address of the drawing instruction is an address of the MEM 201#0. Based on the determination result, the OS 203#0 accesses the MEM 201#0 through the memory driver 204#0 if the object address of the drawing instruction is an address of the MEM 201#0. If the object address of the drawing instruction is not an address of the MEM 201#0, the OS 203#0 transmits an access request through the communication driver 205#0 to the communication apparatus 101#1.

The communication driver 205#0 receiving the access request requests the memory driver 204#1 to access the MEM 201#1 and the memory driver 204#1 accesses the MEM 201#1.

For more detailed description, for example, it is assumed that quarter video graphics arrays (QVGA) having 320 [pixels] in width and 240 [pixels] in height are employed as display areas of the display 108#0 and the display 108#0 for display in 32-bit color.

In this case, a data size of the display area is 320×240×4=0x4b000 [bytes]. If a range of addresses in the MEM 201#0 of the communication apparatus 101#0 is from 0x00000000 to 0x1ffffff, a transfer area to the display 108#0 is defined as 0x1ffb5000 to 0x1fffffff. The communication apparatus 101#1 subsequently sets a transfer area to the display 108#1 to virtual addresses 0x20000000 to 0x2004afff. As a result, the communication system 100 can virtually ensure a 320×480 display area. Since the display area is continuous, drawing processes can easily be executed in the GUI process 701#0, the GUI process 701#1, and the game process 702.

FIG. 8 is an explanatory view of an example of storage contents of an event table 801. When an instruction for details of processing is given to the other apparatus, an executed event ID is prepared as in the event table 801 and the event ID is given to the other apparatus, thereby causing the other apparatus to execute a process corresponding to the event ID. The event IDs "0" to "3" are used in the communication system 100 according to the first embodiment and the event IDs "1" and "4" to "7" are used in the communication system 100 according to a second embodiment described hereinafter.

For example, when the communication apparatus 101#0 transmits the event ID "0" to the communication apparatus 101#1, the communication apparatus 101#1 recognizes that a wireless connection request is received. Similarly, when the communication apparatus 101#0 transmits the event ID "1" to the communication apparatus 101#1, the communication apparatus 101#1 recognizes that a notification related to disconnection of wireless connection is received. When the communication apparatus 101#0 transmits the event ID "4" to the communication apparatus 101#1, the communication apparatus 101#1 recognizes that a wireless connection request for distributed processing is received.

The communication apparatus may transmit another parameter together at the time of transmission of the event ID. For example, the communication apparatus 101#0 transmits the event ID "2" and an address to the communication apparatus 101#1, the communication apparatus 101#1 recognizes that the communication apparatus 101#1 receives a notification related to a read instruction in the case that an address of an access destination is out of the physical addresses of the apparatus. From analysis of the parameter, the communication apparatus 101#1 further recognizes the address of the parameter as the address of the address destination.

Similarly, when the communication apparatus 101#0 transmits to the communication apparatus 101#1, the event ID "3", an address, and given data to be written, the communication apparatus 101#1 recognizes that the communication apparatus 101#1 receives a notification related to a write instruction in the case that an address of an access destination is out of the physical addresses of the apparatus. From analysis of the parameters, the communication apparatus 101#1 further recognizes the address of the parameter as the address of the access destination and recognizes the given data as data to be written at the address of the access destination.

When the communication apparatus 101#0 transmits the event ID "5", an address, and an updated value to the communication apparatus 101#1, the communication apparatus 101#1 recognizes that the communication apparatus 101#1 receives a notification of an updated value via a communication driver to the other apparatus after write access to data specific to the apparatus. From analysis of the parameters, the communication apparatus 101#1 further recognizes the address of the parameter as the address subjected to the write access and recognizes the updated value of the parameter as a value written at the address subjected to the write access.

When the communication apparatus 101#0 transmits the event ID "6" and an address to the communication apparatus 101#1, the communication apparatus 101#1 recognizes that a transfer request for the transfer of data to the other apparatus via a communication driver is received. From analysis of the parameter, the communication apparatus 101#1 further recognizes that the address of the parameter is the address of the data requested to be transferred.

When the communication apparatus 101#0 transmits the event ID "7" and an I/O log to the communication apparatus 101#1, the communication apparatus 101#1 recognizes that the I/O log is transmitted thereto. From analysis of the parameter, the communication apparatus 101#1 further recognizes that the I/O log of the parameter is the actually transmitted I/O log.

FIG. 9 is a flowchart of a memory area sharing start process and a memory area sharing end process according to the first embodiment. In the memory area sharing start process and the memory area sharing end process depicted in FIG. 9, it is assumed that the communication apparatus 101#0 and the communication apparatus 101#1 are a master apparatus and a slave apparatus, respectively. Operations at step S901 to step S908 and step S910 represent the memory area sharing start process and operations at step S912 to step S915 represent the memory area sharing end process. Operations at step S909 and step S911 represent the memory area sharing process under execution.

The communication apparatus 101#0 transmits a wireless connection request according to a request from the process 401#0, etc. under execution (step S901) and the communication apparatus 101#1 receives the connection request (step S902). The communication apparatus 101#0 transmitting the connection request waits until a response to the connection request is made. For example, the communication apparatus 101#0 transmits the event ID "0" depicted in FIG. 8 and the communication apparatus 101#1 receives the event ID "0" and recognizes that a connection request is received.

The communication apparatus 101#1 receiving the connection request determines whether the connection request is permitted (step S903). The communication apparatus 101#1 may always permit the connection request or may make the determination depending on a state of the communication apparatus 101#1. For example, if the number of currently executed processes is greater than or equal to a certain number, the communication apparatus 101#1 may determine that the connection request is not permitted due to an excessive load. Alternatively, the communication apparatus 101#1 may display the received connection request on the display 108#1 to receive the permission of the connection request from a user.

If the connection request is not permitted (step S903: NO), the communication apparatus 101#1 transmits connection NG to the communication apparatus 101#0 (step S904) and terminates the memory area sharing start process. If the connection request is permitted (step S903: YES), the communication apparatus 101#1 determines whether a process under execution is present (step S905). If no process under execution is present (step S905: NO), the communication apparatus 101#1 determines whether the interrupt processing is supported during the memory area sharing process (step S906).

If the interrupt processing is not supported (step S906: NO), the communication apparatus 101#1 turns the OS 203#1 to the sleep mode (step S907) and transmits connection OK to the communication apparatus 101#0 (step S908). If the operation at step S907 is executed, the communication system 100 goes to the first operation in the memory area sharing process depicted in FIG. 4 and, if the operation at step S907 is not executed, the communication system 100 goes to the second operation in the memory area sharing process depicted in FIG. 5.

If a process under execution exists (step S905; YES) or if the interrupt processing is supported (step S906: YES), the communication apparatus 101#1 goes to the operation at step S908 and executes the memory area sharing process (step S909). The memory area sharing process will be described in detail with reference to FIG. 10. The communication apparatus 101#0 receiving a response at step S904 or step S908 determines a connection result (step S910). If the connection result is connection NG (step S910: NG), the communication apparatus 101#0 disconnects the wireless connection (step S915) and terminates the memory area sharing start process.

If a response is not yet received (step S910: AWAITING RESPONSE), the communication apparatus 101#0 executes the operation at step S910 again after a given period. If the connection result is connection OK (step S910: OK), the communication apparatus 101#0 executes the memory area sharing process (step S911). After the termination of the memory area sharing process, the communication apparatus 101#0 transmits disconnection of the connection (step S912) and goes to the operation at step S915 to terminate the memory area sharing process. For example, the communication apparatus 101#0 transmits the event ID "1" depicted in FIG. 8 and the communication apparatus 101#1 receives the event ID "1" to recognize that a notification related to disconnection of the connection is received.

The communication apparatus 101#1 receiving the notification of disconnection in the operation at step S912 determines whether the OS 203#1 is in the sleep mode (step S913). In the case of the sleep mode (step S913: YES), the communication apparatus 101#1 recovers the OS 203#1 (step S914). If the OS 203#1 is not in the sleep mode (step S913: NO) or after the operation at step S914, the communication apparatus 101#1 terminates the memory area sharing end process.

At step S908, the communication apparatus 101#1 may give notification of a range of the memory provided to the communication apparatus 101#0. For example, if a range of addresses in the MEM 201#1 is from 0x00000000 to 0x1fffffff, the communication apparatus 101#1 notifies the communication apparatus 101#0 of 0x10000000 to 0x1fffffff as a range of the provided memory. The notified communication apparatus 101#0 sets 0x10000000 to 0x1fffffff as virtual addresses 0x20000000 to 0x2fffffff, for example. As a result, if an access request is issued to an address included in 0x20000000 to 0x2fffffff in the memory area sharing process, the communication apparatus 101#0 determines the access request as an access request to the other apparatus.

Figure 10:
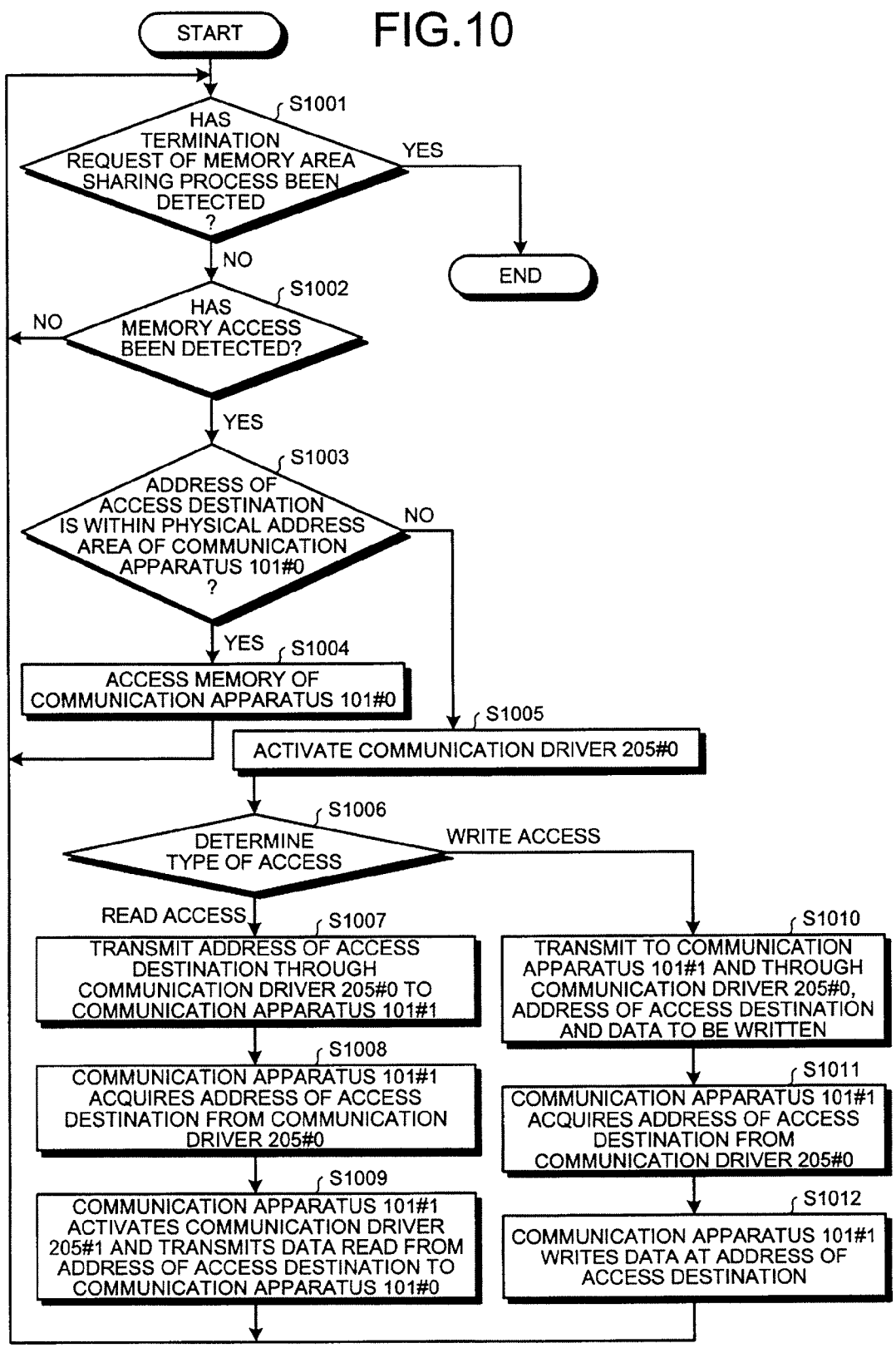
FIG. 10 is a flowchart of the memory area sharing process according to the first embodiment.

FIG. 10 is a flowchart of the memory area sharing process according to the first embodiment. The memory area sharing process is executed by a master apparatus and a slave apparatus. In the description of FIG. 10, it is assumed that the communication apparatus 101#0 acts as the master apparatus to execute the memory area sharing process in the communication apparatus 101#0.

The communication apparatus 101#0 determines whether a termination request of the memory area sharing process has been detected (step S1001). If the termination request is detected (step S1001: YES), the communication apparatus 101#0 terminates the memory area sharing process. The communication apparatus 101#0 detects a termination request of the memory area sharing process, for example, if the process 401 requesting the memory area sharing process is terminated. The termination request may be detected if the communication apparatus 101#0 detects that the communication apparatus 101#0 is not operated for a given period or longer during the memory area sharing process. The termination request may be detected if a user issues a termination request of the memory area sharing process and the communication apparatus 101#0 detects the termination request.

If the termination request of the memory area sharing process is not detected (step S1001: NO), the communication apparatus 101#0 determines whether memory access has been detected (step S1002). If memory access has not been detected (step S1002: NO), the communication apparatus 101#0 goes to the operation at step S1001. If memory access has been detected (step S1002: YES), the communication apparatus 101#0 determines whether the address of the access destination is within a physical address area of the communication apparatus 101#0 (step S1003).

In the determination at step S1003, the physical address area includes the area of the MEM 201#0. If the communication apparatus 101#0 has a form of memory-mapped I/O, in which an address space of an input/output device coexists with an address space of a memory, the addresses of the input/output device are included in the physical addresses of the communication apparatus 101#0.

If the address of the access destination is within the physical address area of the communication apparatus 101#0 (step S1003: YES), the communication apparatus 101#0 accesses the memory of the communication apparatus 101#0 (step S1004) and goes to the operation at step S1001. If not within the physical address area of the communication apparatus 101#0 (step S1003: NO), the communication apparatus 101#0 activates the communication driver 205#0 (step S1005) and determines the type of access (step S1006).

If the type of access is a read access (step S1006: READ ACCESS), the communication apparatus 101#0 transmits the address of the access destination through the communication driver 205#0 to the communication apparatus 101#1 (step S1007). The communication apparatus 101#1 acquires the address of the access destination from the communication driver 205#0 (step S1008). For example, the communication apparatus 101#0 transmits the event ID "2" depicted in FIG. 8 and the address of the access destination, and the communication apparatus 101#1 recognizes that a read instruction request to the address of the access destination indicated in the received contents is received because of the received event ID "2".

The communication apparatus 101#1 acquiring the address of the access destination activates the communication driver 205#1 and transmits data read from the address of the access destination to the communication apparatus 101#0 (step S1009). The communication apparatus 101#0 receiving the data supplies the data to a process that is the source of the memory access, and goes to the operation at step S1001.

If the type of the access is a write access (step S1006: WRITE ACCESS), the communication apparatus 101#0 transmits to the communication apparatus 101#1, the address of the access destination and data to be written, via the communication driver 205#0 (step S1010). The communication apparatus 101#1 acquires the address of the access destination from the communication driver 205#0 (step S1011). For example, the communication apparatus 101#0 transmits the event ID "3" depicted in FIG. 8, the address of the access destination, and the data to be written. The communication apparatus 101#1 recognizes that a write instruction to the address of the access destination in the received contents is received because of the received event ID "3".

The communication apparatus 101#1 acquiring the address of the access destination writes the data at the address of the access destination (step S1012). The communication apparatus 101#0 transmitting the address of the access destination in the operation at step S1007 goes to the operation at step S1001.

As described, according to the communication apparatus, the communication method, and the communication program of the first embodiment, if an access request is made to a destination other than the memory of the apparatus, the apparatus transmits the access request to the other apparatus and the other apparatus accesses a memory space of the other apparatus. As a result, the communication apparatus can skip the file formation and deployment processing executed at the time of communication and can eliminate the overhead. Since a memory space is expanded by defining the memory of the other apparatus as the memory of the apparatus in a pseudo manner, the data of a high-priority process can be prevented from being paged-out.

By defining the memory of the other apparatus as the memory of the apparatus in a pseudo manner, correlation can easily be made between contents of the memories of the other apparatus and the apparatus. For example, a communication apparatus can easily virtually handle the displays of the communication apparatus and the other apparatus as one screen.

Since data can be shared without using a format of a file as described above, a new application can be executed such as a game for portable terminals driving multiple portable terminals to operate in a coordinated manner. For example, two independent portable terminals are prepared and one half of each screen is coordinated to activate a game application while the other half of each screen is used as controllers so that two persons can play the game at the same time.

Although two communication apparatuses are present in the communication system 100 according to the first embodiment, the communication system may be formed with three or more communication apparatuses. For example, the communication system 100 according to the first embodiment may further include a communication apparatus 101#2 and the communication apparatus 101#0 may act as a master apparatus while the communication apparatus 101#1 and the communication apparatus 101#2 act as slave apparatuses.

In this case, the communication apparatus 101#0 may divide an area out of the physical addresses of the communication apparatus 101#0 into an area of accessing a memory of the communication apparatus 101#1 and an area of accessing a memory of the communication apparatus 101#2. Subsequently, after the operation at step S1003: YES of FIG. 10, the communication apparatus 101#0 may determine whether access is gained to the memory of the communication apparatus 101#1 or the memory of the communication apparatus 101#2 based on the address of the access destination.

Figure 11:
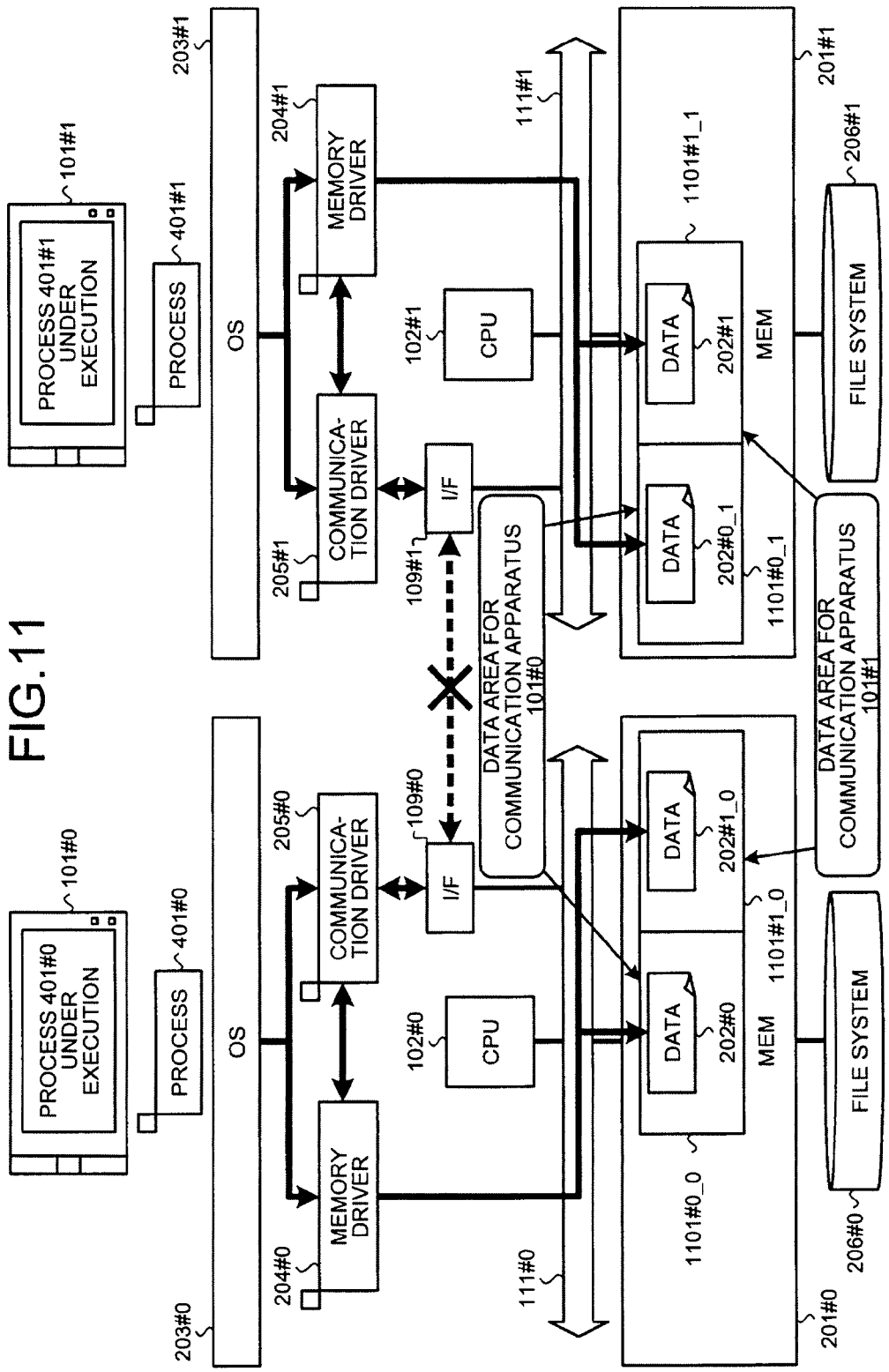
FIG. 11 is an explanatory view of a disadvantage of the communication system 100 according to the first embodiment.

FIG. 11 is an explanatory view of a disadvantage of the communication system 100 according to the first embodiment. If communication is cut off, the communication system 100 according to the first embodiment cannot access the memory area of the connected apparatus and therefore, cannot continue processing. It is also assumed that the communication system 100 according to the first embodiment uses shared data areas in such a manner as to ensure a data area for the communication apparatus 101#1 in the MEM 201#0 and a data area for the communication apparatus 101#0 in the MEM 201#1 as depicted in FIG. 11.

In a specific method of ensuring the shared data areas, the CPU 102#0 ensures a data area 1101#0_0 and a data area 1101#1_0 as areas for sharing data with the communication apparatus 101#1 and stores data 202#0 into the data area 1101#0_0. The CPU 102#0 stores data equivalent to data 202#1 as data 202#1_0 into the data area 1101#0_0.

The CPU 102#1 ensures a data area 1101#1_0 and a data area 1101#1_1 as areas for sharing data with the communication apparatus 101#0 and stores the data 202#1 into the data area 1101#1_1. The CPU 102#1 stores data equivalent to the data 202#0 as data 202#0_1 into the data area 1101#0_1. However, even if the shared data areas are used, coherency of data cannot be established between the apparatuses at the time of reconnection and the communication system 100 must restart processing from the beginning.

In the technique according to Patent Document 5, undelivered data at the time of failure is redelivered by a server during normal time. Even if this technique is applied to the communication system 100 according to the first embodiment, it is problematically difficult to execute the processing while a line is cutoff. The communication system 100 according to a second embodiment depicted in FIGS. 12 to 19 is intended to allow the communication system 100 according to the first embodiment to continue processing as far as possible even while a line is cut off and to resume the processing when the line is reconnected.

Figure 12:
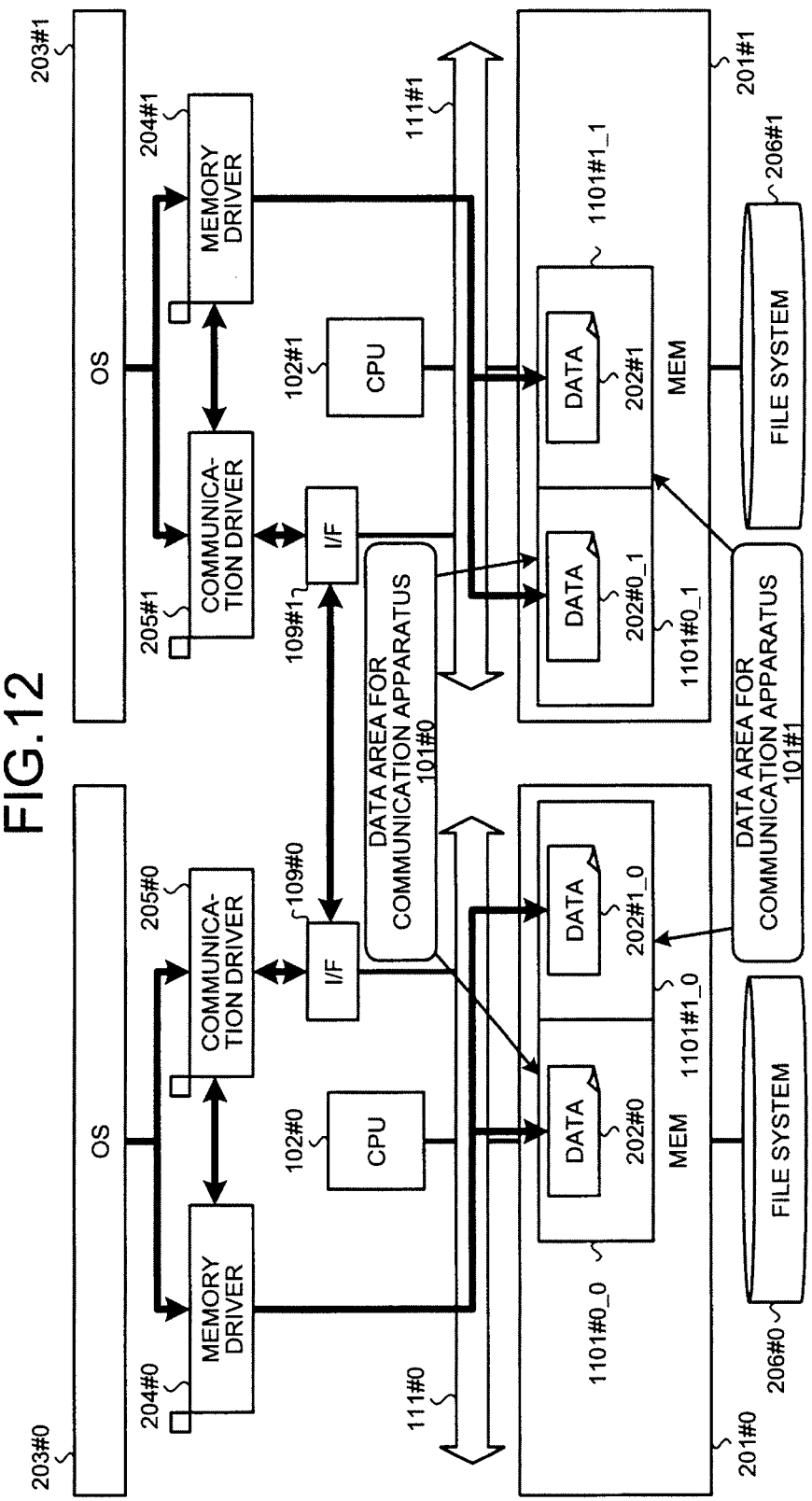
FIG. 12 is an explanatory view of general operation of the communication system 100 according to a second embodiment.

FIG. 12 is an explanatory view of general operation of the communication system 100 according to the second embodiment. In FIGS. 12 to 19, if not particularly specified, the description of the communication system 100 will hereinafter be described in terms of the communication system 100 according to the second embodiment. The communication system 100 depicted in FIG. 12 is formed with hardware equivalent to the hardware of the communication system 100 according to the first embodiment depicted in FIG. 2 and functionality ensuring the shared data areas described with reference to FIG. 11.

If the communication apparatus 101 in the communication system 100 gains write access to data specific to the communication apparatus 101, the communication apparatus 101 makes a coherency request to the other apparatus. For example, if the communication apparatus 101#0 gains write access to the data 202#0, the communication apparatus 101#0 transmits a write result through the communication driver 205#0 to the communication apparatus 101#1 and requests the communication apparatus 101#1 to establish coherency. The communication apparatus 101#1 receiving the request updates the data 202#0_1 present in the shared data area to establish coherency. As a result, the data 202#0_0 matches the data 202#0_1 and the coherency is achieved.

If a communication state is cut off when the communication apparatus 101 in the communication system 100 gains write access to data specific to the communication apparatus 101, the communication apparatus 101 does not make a request for coherency to the other apparatus and describes a write result from the write access in an I/O log. After the connection state is established, the communication apparatus 101 transmits the I/O log to the other apparatus and the other apparatus establishes coherency based on the received I/O log. The handling of the I/O log will be described with reference to FIGS. 14 and 15, and the I/O log will be described in detail with reference to FIG. 17.

If the communication apparatus 101 in the communication system 100 gains read access to data specific to the other apparatus, the communication apparatus 101 determines via the communication driver whether data is up to date, while performing a tentative execution based on the data in the shared data area. If the data is old, the communication apparatus 101 performs the execution again from the time of read access.

For example, if the communication apparatus 101#0 gains read access to the data 202#1, a process requesting the read access performs a tentative execution based on the data 202#1_0 stored in the shared data area. The communication apparatus 101#0 acquires a value of the data 202#1 through the communication driver 205#0 and compares the value with the data 202#1_0 stored in the shared data area. If the data 202#1 stored in the shared data area does not coincide and is old, the execution is performed again from the state of reading the data 202#1_0 before the tentative execution.

The communication apparatus 101 in the communication system 100 does not gain write access to data specific to the other apparatus. For example, the communication system 100 can replace the write access to data specific to the other apparatus with a form in which data is written into the area specific to the communication apparatus 101 and read by the other apparatus.

Figure 13:
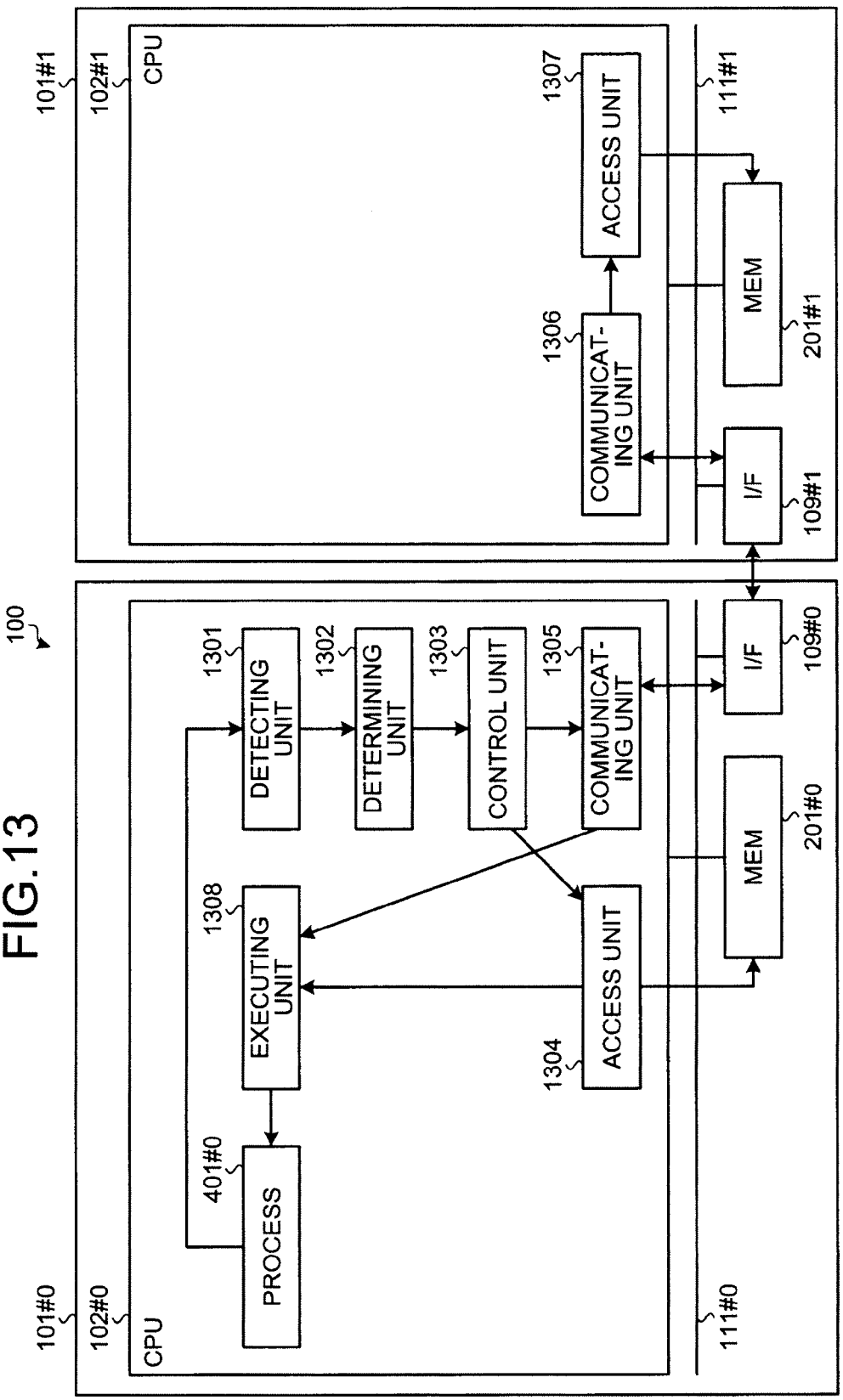
FIG. 13 is a block diagram of functions of the communication system 100 according to the second embodiment.

Functions of the communication system 100 according to the second embodiment will be described. FIG. 13 is a block diagram of functions of the communication system 100 according to the second embodiment. The communication system 100 according to the second embodiment includes a detecting unit 1301, a determining unit 1302, a control unit 1303, an access unit 1304, a communicating unit 1305, a communicating unit 1306, an access unit 1307, and an executing unit 1308.

The functions (the detecting unit 1301 to the executing unit 1308) acting as a control unit are implemented by the CPU 102#0 and the CPU 102#1 executing programs stored in storage devices. The storage devices are, for example, the ROM 103, the RAM 104, the flash ROM 105, and the flash ROM 107 depicted in FIG. 1. Alternatively, programs may be acquired via the I/F 109 and the CPU 102#0 and the CPU 102#1 may execute the acquired programs to implement the functions.

In the state of FIG. 13, the detecting unit 1301 to the communicating unit 1305 and the executing unit 1308 are included in the functions of the communication apparatus 101#0, and the communicating unit 1306 and the access unit 1307 are included in the functions of the communication apparatus 101#1. The detecting unit 1301 to the communicating unit 1305 and the executing unit 1308 are also included in the functions of the communication apparatus 101#1. The determining unit 1302, the communicating unit 1305, the communicating unit 1306, and the access unit 1307 have the same functions as the determining unit 302, the communicating unit 305, the communicating unit 306, and the access unit 307 and will not be described.

The detecting unit 1301 has a function of detecting an access request generated from the communication apparatus implementing the detecting unit 1301. The detecting unit 1301 may detect a communication state of the communication apparatus implementing detecting unit 1301 and the other apparatus. The detecting unit 1301 may detect a write result in a memory of the communication apparatus implementing the detecting unit 1301, corresponding to a write request generated from the executing unit 1308 as an access request through the access unit 1304.

For example, the detecting unit 1301 detects a cutoff or connected state of communication between the communication apparatus 101#0 and the communication apparatus 101#1. The detecting unit 1301 detects a write result in the MEM 201#0 through the access unit 1304. The detection result is stored into a register of the CPU executing the detecting unit 1301 and a storage area such as a memory. For example, if the detecting unit 1301 is executed in the communication apparatus 101#0, the detection result is stored into a register of the CPU 102#0 and the MEM 201#0.

The control unit 1303 has a function of selecting and executing either the process of the access unit 1304 or the process of the communicating unit 1305 based on the determination result determined by the determining unit 1302. If the determining unit 1302 determines that a read request generated from the executing unit 1308 as an access request is not to an address allocated to a memory of the communication apparatus implementing the determining unit 1302, the control unit 1303 may drive the communicating unit 1305 to communicate with the other apparatus, based on the read request. For example, if a read request generated from the process 401#0 is not to an address of the MEM 201#0, the control unit 1303 may use the communicating unit 1305 to transmit the read request through the I/F 109#0 to the communication apparatus 101#1.

After the detecting unit 1301 detects that the communication state is cut off, if determining unit 1302 determines that an access request is not to an address allocated to a memory of the communication apparatus implementing the determining unit 1302, the control unit 1303 suspends the executing unit 1308. Subsequently, if the detecting unit 1301 detects that the communication state is connected, the control unit 1303 may cancel the suspension of the executing unit 1308. For example, while the communication state is cut off, if an access request is to an address allocated to a memory of the other apparatus, the control unit 1303 may suspend the process 401#0 and, if the communication state is connected, the control unit 1303 may cancel the suspension of the process 401#0.

If the detecting unit 1301 detects a write result in a memory of the communication apparatus implementing the detecting unit 1301, the control unit 1303 may drive the communicating unit 1305 to transmit a coherency request to establish coherency, based on the write result to the other apparatus. With regard to the coherency request based on the write result, for example, when the apparatus transmits a write result and an event ID indicative of a coherency request, the other apparatus receives the transmission and recognizes that the coherency request is received. For example, if a write result in the MEM 201#0 is detected, the control unit 1303 drives the communication apparatus 101#1 to transmit a coherency request based on the write result through the I/F 109#0.

If a coherency request is received from the other apparatus, the control unit 1303 may drive the access unit 1304 to perform writing into a memory of the communication apparatus implementing the access unit 1304, as a read result. For example, if a value of the data 202#1 is received as a coherency request, the control unit 1303 drives the access unit 1304 to write the value as the data 202#1_0. The written data is used for a tentative execution.

If the detecting unit 1301 detects that the communication state transits from the cutoff state to the connected state, the control unit 1303 may drive the communicating unit 1305 to transmit to the other apparatus a coherency request based on a write result in a memory of the communication apparatus implementing the communicating unit 1305, during the cutoff state. A method of recording a write result into a memory of the communication apparatus during the cutoff state may be a method such as setting a flag in a memory in which writing is performed. In this case, the control unit 1303 transmits an address at which the flag is set to the other apparatus at the time of the coherency request. In the second embodiment, the control unit 1303 describes a write result in an I/O log and transmits the I/O log to the other apparatus at the time of the coherency request.

The access unit 1304 has a function of accessing a memory of the communication apparatus implementing the access unit 1304. The access unit 1304 may use the communicating unit 1305 to write a read result corresponding to the read request into a memory of the communication apparatus implementing the access unit 1304. For example, the access unit 1304 uses the communicating unit 1305 to write a read result acquired through the I/F 109#0 into the data area 1101#1_0.

The executing unit 1308 has a function of executing a process. For example, the executing unit 1308 executes the process 401#0. The executing unit 1308 may execute the process by using a read result written by the access unit 1304. For example, the executing unit 1308 executes the process 401#0 by using the data 202#1_0 that is a read result written in the data area 1101#1_0.

The executing unit 1308 may execute a process by using a read result written into a memory of the communication apparatus implementing the executing unit 1308, until a new read result is written for a read request newly issued by the access unit 1304. For example, the executing unit 1308 executes the process 401#0 by using the already written data 202#1_0 until a new read request to a memory of the communication apparatus 101#1 is issued and a new read result is written into the data area 1101#1_0. This enables the executing unit 1308 to perform a tentative execution.

Figure 14:
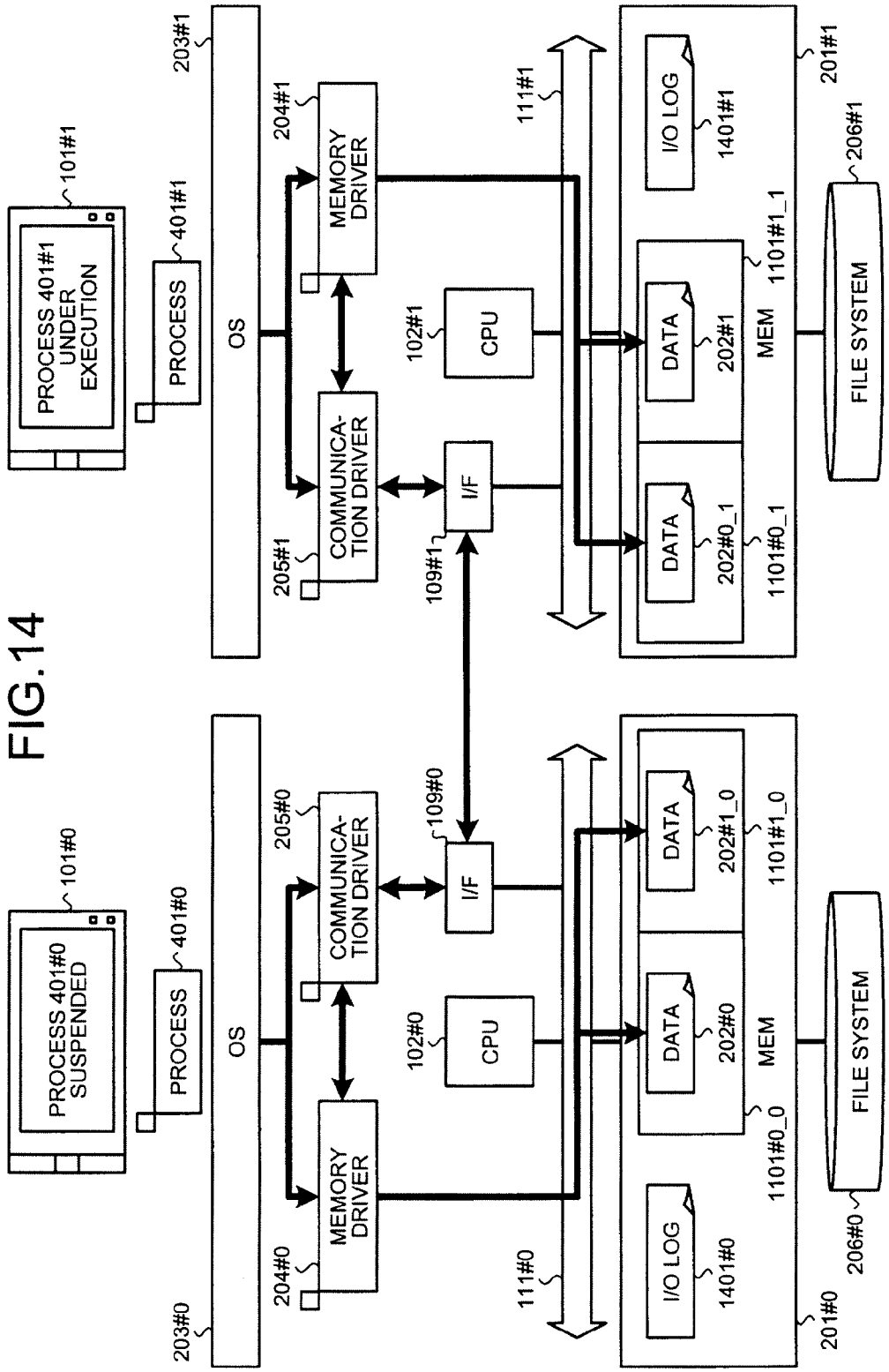
FIG. 14 is an explanatory view of general operation during cutoff in the memory sharing process of the communication system 100 according to the second embodiment.

FIG. 14 is an explanatory view of general operation during cutoff in the memory sharing process of the communication system 100 according to the second embodiment. Wireless connection is not established and communication is cut off between the communication apparatus 101#0 and the communication apparatus 101#1. If the communication is cut off, the process 401#0 and the process 401#1 executed in the communication apparatus 101#0 and the communication apparatus 101#1 are continuously executed in the apparatuses until a point at which data of a connected apparatus is read.

If an access request for a memory area of a connected apparatus via a communication driver is generated, the communication apparatus 101 makes a reconnection request and goes to a low-power mode. For example, the communication apparatus 101#0 continues processing of the process 401#1 until a point at which data of the other apparatus is read. If reading of the data 202#1_0 is detected, the communication apparatus 101#0 makes a reconnection request, suspends the processing of the process, and goes to the low-power mode. When making a reconnection request, the communication apparatus 101#0 may display the reconnection request on the display 108#0 and wait for a response from a user as to whether a connection request is issued.

For example, the communication apparatus 101#0 suspends the process 401#0 because the process 401#0 performs reading of the data 202#1_0. The communication apparatus 101#1 can continuously execute the processing of the process 401#1 because the process 401#1 only reads and writes the data 202#1 and does not perform reading of the data 202#0.

The communication apparatus 101 records a write access to data specific to the communication apparatus 101 into an I/O log from the time point of cutoff of the connection state. In this case, the communication apparatus 101 does not make a coherency request to the other apparatus, which is made at the time of the write access to data specific to the communication apparatus 101. For example, the communication apparatus 101#0 records a write access data specific to the terminal of the communication apparatus 101#0, i.e., the data 202#0, into an I/O log 1401#0 from the time point of cutoff of the connection state and stops a coherency request notification to the communication apparatus 101#1.

Figure 15:
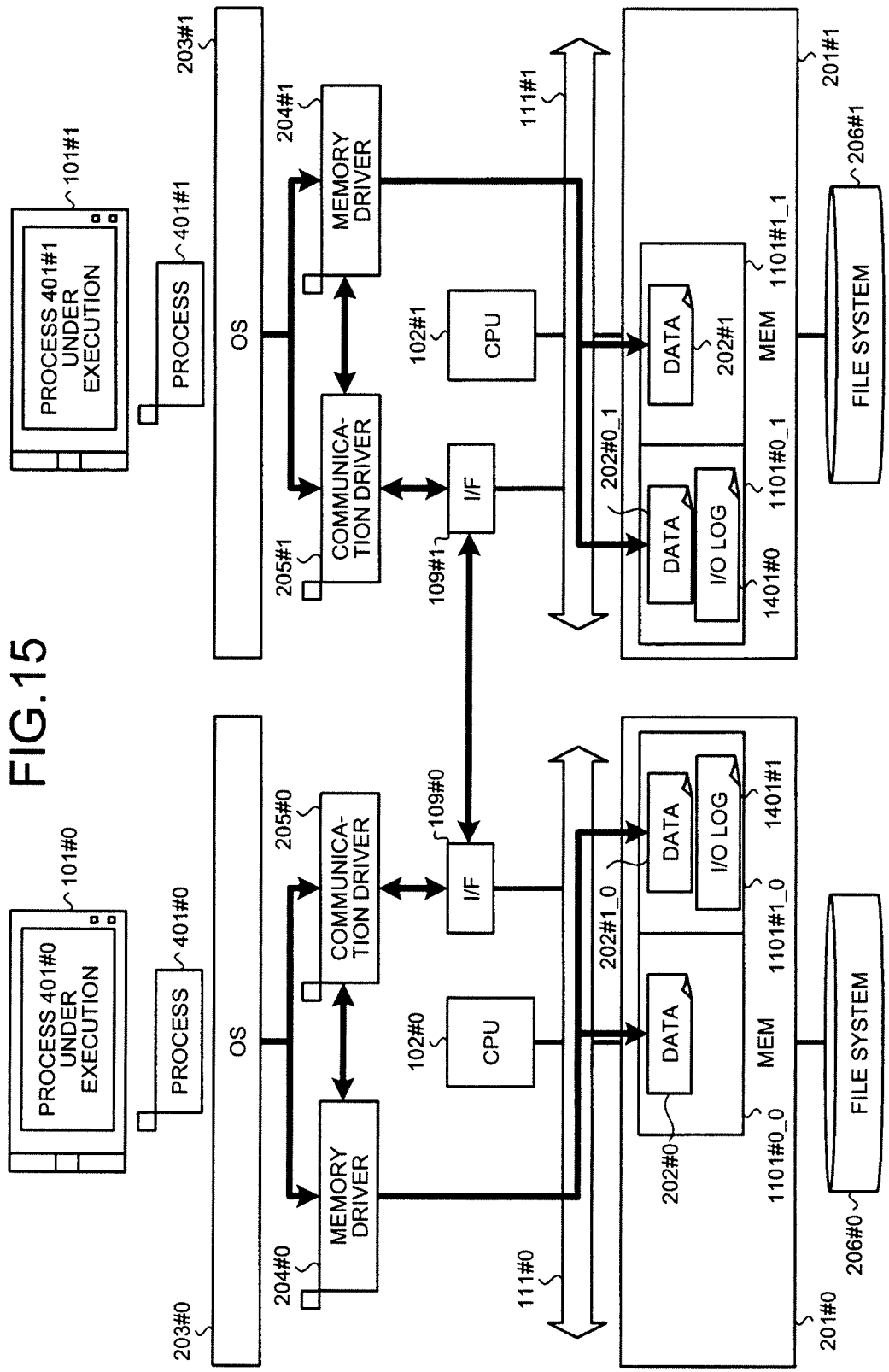
FIG. 15 is an explanatory view of general operation at the time of reconnection in the memory sharing process of the communication system 100 according to the second embodiment.

FIG. 15 is an explanatory view of general operation at the time of reconnection in the memory sharing process of the communication system 100 according to the second embodiment. The communication system 100 of FIG. 15 represents a state in which communication is reconnected after the state of FIG. 14. If the communication is reconnected, each apparatus transmits the I/O log to the connected apparatus. For example, the communication apparatus 101#0 transmits the I/O log 1401#0 to the communication apparatus 101#1 and the communication apparatus 101#1 transmits an I/O log 1401#1 to the communication apparatus 101#0.

After transmitting the I/O log, each apparatus enters the normal mode and establishes coherency among the data based on the I/O log and thereby, resumes execution of the process. For example, the communication apparatus 101#0 updates the data 202#1_0 from the I/O log 1401#1 and resumes execution of the suspended process 401#0.

Figure 16:
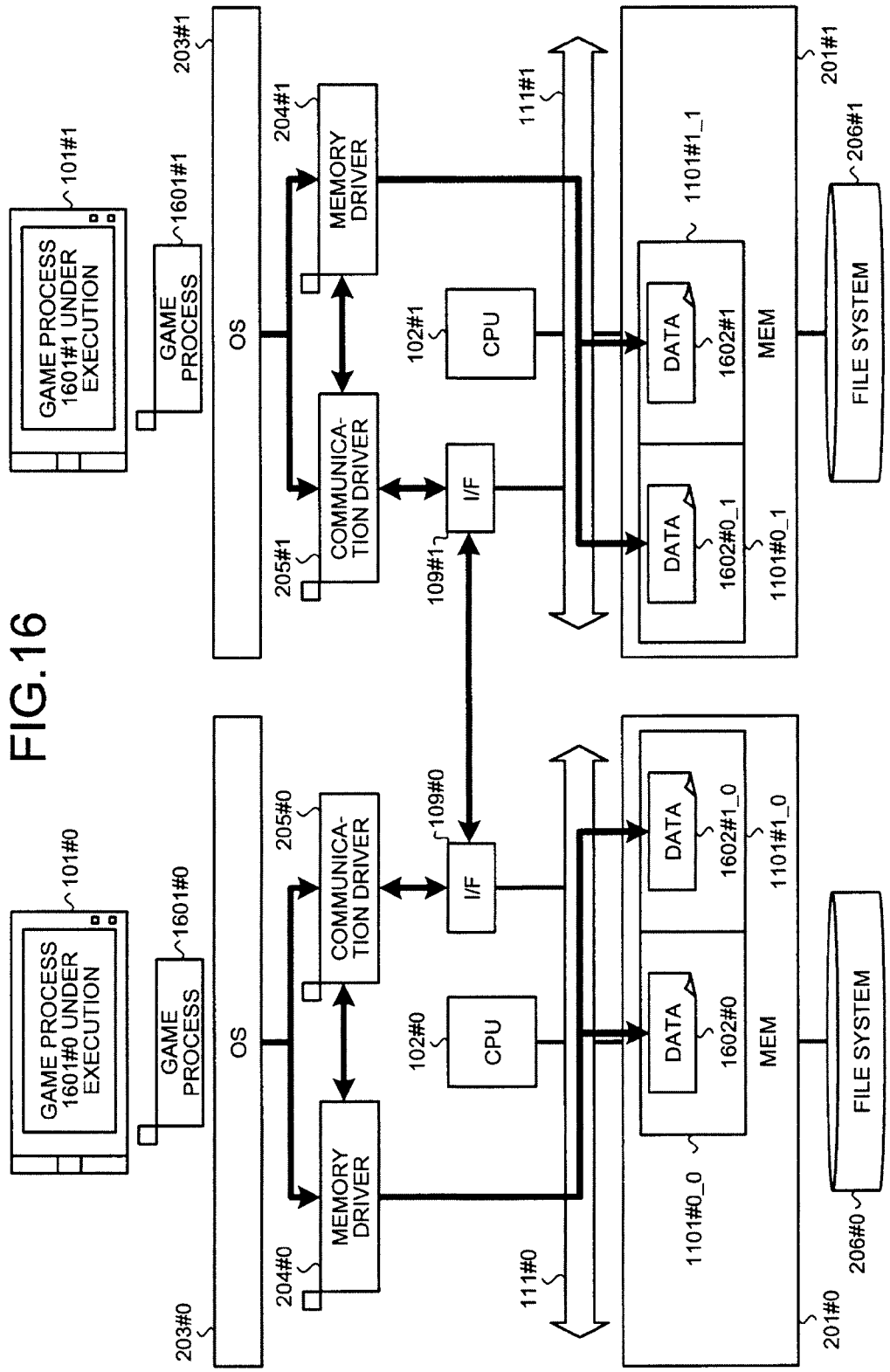
FIG. 16 is an explanatory view of a state in which a game application is under execution in the communication system 100 according to the second embodiment.

FIG. 16 is an explanatory view of a state in which a game application is under execution in the communication system 100 according to the second embodiment. In the communication system 100 of FIG. 16, the communication apparatus 101#0 executes a game process 1601#0 and the communication apparatus 101#1 executes a game process 1601#1. Even if communication is temporarily cut off in a game process etc., connecting multiple apparatuses by radio, etc. depicted in FIG. 16, the game process can be continued without restart by the operation described with reference to FIGS. 14 and 15.

For example, each time writing is performed into data 1602#0 used by the game process 1601#0, the communication apparatus 101#0 transmits the write result to the communication apparatus 101#1 and makes a request to establish coherency. The communication apparatus 101#1 receiving the write result establishes coherency of data 1602#0_1 based on the write result and thereby, makes the data 1602#0_1 equivalent to the data 1602#0.

If the wireless connection is cut off, the communication apparatus 101#0 and the communication apparatus 101#1 record each write access to the data 1602#0 and data 1602#1 into I/O logs. After the reconnection, the communication apparatus 101#0 and the communication apparatus 101#1 transmit the I/O log to each other and establish coherency of data 1602#1_0 and the data 1602#0_1. After the coherency is established, the communication apparatus 101#0 and the communication apparatus 101#1 continue the game process 1601#0 and the game process 1601#1. Since processing can be continued without restarting each time communication is cut off as described above, the usability of game application can be improved for users.

FIG. 17 is an explanatory view of an example of the I/O log according to the second embodiment. The I/O log records a virtual address at which the communication apparatus 101 performs writing and a value written at the virtual address. For example, in the example of FIG. 17, if 0 is written at a virtual address 0x12345678, the communication apparatus 101#0 stores "0x12345678" and "0" into the I/O log. Similarly, if 1 is written at a virtual address 0x23456789, the communication apparatus 101#0 stores "0x23456789" and "1" into the I/O log. If 2 is written at a virtual address 0x34567890, the communication apparatus 101#0 stores "0x34567890" and "2" into the I/O log.

Although the I/O log is generated for each byte in the example of FIG. 17, the I/O log may be generated on a different basis. For example, the communication apparatus 101#0 may generate the I/O log for every 4 bytes. For example, if 0xffffffff is written at a virtual address 0x10000000, the communication apparatus 101#0 stores "0x10000000" and "0xffffffff" into the I/O log. If the same address already exists in the I/O log, the communication apparatus 101 may overwrite a value.

FIG. 18 is a flowchart of a distribution start process and a distribution end process according to the second embodiment. Operations at step S1801 to step S1807 and at step S1809 to step S1811 represent the distribution start process and operations at step S1813 to step S1816 represent the distribution end process. Operation at step S1808 and step S1812 represent the distributed processing under execution.

The communication apparatus 101#0 transmits a wireless connection request for the distributed processing (step S1801). The communication apparatus 101#1 receives the connection request (step S1802). For example, the communication apparatus 101#0 transmits the event ID "4" depicted in FIG. 8 and the communication apparatus 101#1 receives the event ID "4" to recognize that the connection request for the distributed processing is received.

The communication apparatus 101#0 may transmit an apparatus ID and a shared memory size as information of a process executing the distributed processing, along with the event ID. The apparatus ID is an ID specific to an apparatus and is, for example, a media access control (MAC) address or a serial number of an apparatus. The shared memory size is a size of a shared memory used by the process executing the distributed processing. The communication apparatus 101#1 sets a size of an area established for the shared memory based on this size.

The communication apparatus 101#1 receiving the connection request determines whether the connection request is permitted (step S1803). The communication apparatus 101#1 may always permit the connection request or may make the determination depending on a state of the communication apparatus 101#1. For example, if the number of currently executed processes is greater than or equal to a given number, the communication apparatus 101#1 may determine that the connection request is not permitted due to an excessive load. The communication apparatus 101#1 may compare the apparatus ID in the process data received at step S1801 with the ID already registered in the communication apparatus 101#1 to permit the connection request if matched. The communication apparatus 101#1 may display the received connection request on the display 108#1 to receive permission of the connection request from a user.

If the connection request is not permitted (step S1803: NO), the communication apparatus 101#1 transmits connection NG to the communication apparatus 101#0 (step S1804) and terminates the distribution start process. If the connection request is permitted (step S1803: YES), the communication apparatus 101#1 establishes a data area to share data generated by the communication apparatus 101#1 with the connected apparatus and a data area to share data generated by the connected apparatus with the communication apparatus 101#1 (step S1805). For example, the communication apparatus 101#1 establishes the data area 1101#1_1 as a data area for allowing the connected apparatus to share data generated by the communication apparatus 101#1 and establishes the data area 1101#0_1 as a data area for the communication apparatus 101#1 sharing data generated by the connected apparatus.

After the areas are established, the communication apparatus 101#1 sets the established data areas as shared data areas (step S1806), transmits connection OK to the communication apparatus 101#0 (step S1807), and executes the distributed processing (step 91808). The distributed processing will be described in detail with reference to FIGS. 19A, 19B, 19C, and 19D.

The communication apparatus 101#0 receiving a response at step S1804 or step S1807 determines a connection result (step S1809). If the connection result is connection NG (step s1809: NG), the communication apparatus 101#0 disconnects the connection (step S1816) and terminates the distribution start process. If a response is not yet received (step S1809: AWAITING RESPONSE), the communication apparatus 101#0 executes the operation at step S1809 again after a given period.

If the connection result is connection OK (step S1809: OK), the communication apparatus 101#0 establishes a data area for allowing the connected apparatus to share data generated by the communication apparatus 101#0 and a data area for the communication apparatus 101#0 sharing data generated by the connected apparatus (step S1810). For example, the communication apparatus 101#0 establishes the data area 1101#0_0 as a data area for allowing the connected apparatus to share data generated by the communication apparatus 101#0 and establishes the data area 1101#1_0 as a data area for the communication apparatus 101#0 sharing data generated by the connected apparatus.

After the areas are established, the communication apparatus 101#0 sets the established data areas as shared data areas (step S1811) and executes the distributed processing (step S1812). After the distributed processing is terminated, the communication apparatus 101#0 gives notification of disconnection of the connection (step S1813), releases the shared data areas (step S1815), goes to the operation at step S1816, and then terminates the distribution end process. The communication apparatus 101#0 transmits the event ID "1" depicted in FIG. 8 and the communication apparatus 101#1 receives the event ID "1" to recognize that the notification related to disconnection of the connection is received.

After the distributed processing is terminated or when notified of disconnection in the operation at step S1813, the communication apparatus 101#1 releases the shared data areas (step S1814) and terminates the distribution end process.

FIGS. 19A to 19D are flowcharts of the distributed processing according to the second embodiment. The distributed processing is executed in both the communication apparatus 101#0 and the communication apparatus 101#1. In FIGS. 19A to 19D, the flowcharts of the distributed processing in the communication apparatus 101#0 will be described.

FIG. 19A is a flowchart of the distributed processing when connection is continued and the type of access is access related to the apparatus executing the operations in the flowchart. The communication apparatus 101#0 determines whether a termination request for the distributed processing has been detected (step S1901). If a termination request has been detected (step S1901: YES), the communication apparatus 101#0 terminates the distributed processing. For example, the communication apparatus 101#0 detects the termination request of the distributed processing if the communication apparatus 101#0 detects a state in which the communication apparatus 101#0 is not operated for a given period or longer, for example. Alternatively, the termination request may be detected if a user issues a termination request of the distributed processing and the communication apparatus 101#0 detects the termination request.

If termination of the distributed processing is not detected (step S1901: NO), the communication apparatus 101#0 determines whether wireless connection continues (step S1902). If the connection continues (step S1902: YES), the communication apparatus 101#0 determines again whether a termination request for the distributed processing has been detected (step S1903). If a termination request has been detected (step S1903: YES), the communication apparatus 101#0 terminates the distributed processing.

If a termination request of the distributed processing has not been detected (step S1903: NO), the communication apparatus 101#0 determines whether memory access has been detected (step S1904). If memory access has not been detected (step S1904: NO), the communication apparatus 101#0 goes to the operation at step S1901. If memory access has been detected (step S1904: YES), the communication apparatus 101#0 determines the type of access (step S1905). A method of determining whether a type of access is access at the apparatus or the other apparatus is the same as the operation at step S1003 of the first embodiment.

If the type of access is a read access to data specific to a process of the apparatus (step S1905: (1)), the communication apparatus 101#0 reads a memory of the communication apparatus 101#0 (step S1906) and goes to the operation at step S1901. If the type of access is write access to data specific to a process of the apparatus (step S1905: (2)), the communication apparatus 101#0 performs writing and then transfers an updated value via the communication driver 205#0 to the communication apparatus 101#1 (step S1907).

After the transfer, the communication apparatus 101#1 receiving the data transfer via the communication driver 205#0 updates the relevant data to the transferred value via the memory driver 204#1 (step S1908). At step S1907, the communication apparatus 101#1 establishes coherency. For example, the communication apparatus 101#0 transmits the event ID "5" depicted in FIG. 8, an address, and an updated value, and the communication apparatus 101#1 recognizes from the event ID "5" that a request for coherency using the updated value transmitted together is received. The communication apparatus 101#0 transferring the value at step S1907 goes to the operation at step S1901.

Figure 19B:
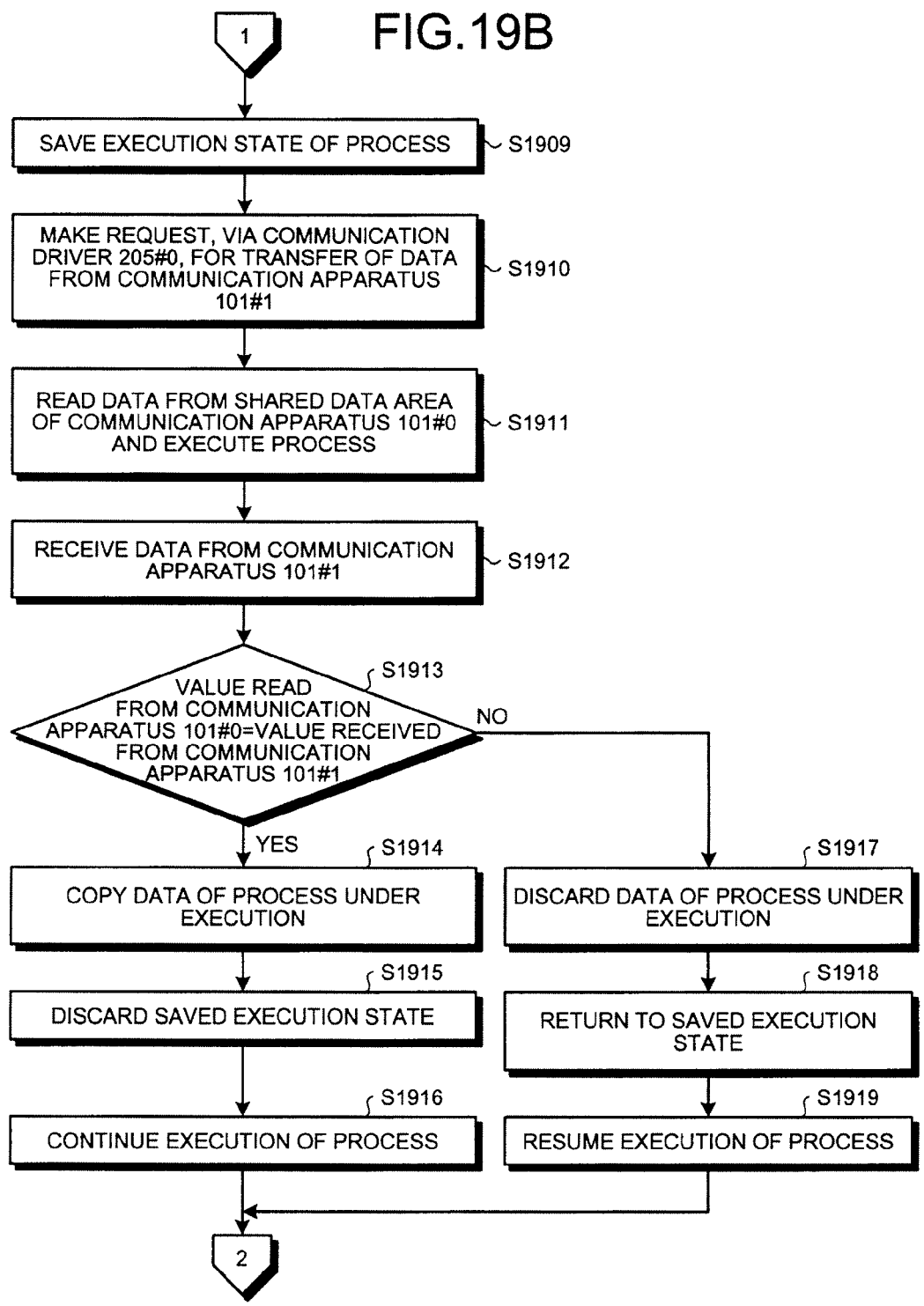
FIG. 19B is a second flowchart of the distributed processing.

FIG. 19B is a flowchart of the distributed processing when connection is continued and the type of access is read access of the other apparatus. If the type of access is a read access to data specific to a process on the other apparatus (step S1905: (3)), the communication apparatus 101#0 saves the execution state of the process (step S1909). The details saved by the communication apparatus 101#0 are contents of a register including a program counter.

After the saving, the communication apparatus 101#0 makes a request via the communication driver 205#0 for transfer of the data from the communication apparatus 101#1 (step S1910). For example, the communication apparatus 101#0 transmits the event ID "6" depicted in FIG. 8 and the address of the data; and the communication apparatus 101#1 receives the event ID "6" to recognize that the transfer request for the data is received.

After requesting the transfer of the data, the communication apparatus 101#0 reads the data from the shared data area of the communication apparatus 101#0 and executes the process (step S1911). Since the process is executed before receiving the data, the operation at step S1911 is tentatively executed. If data having a value updated by write access is generated in the data specific to the process on the communication apparatus 101#0 during the tentative execution, the new value is saved into an area different from the shared data area, and the value saved in this area is used as data under execution in a subsequent tentatively-executed process.

The communication apparatus 101#0 receives the data during the tentative execution of the process (step S1912) and determines whether the value read from the communication apparatus 101#0 coincides with the value received from the communication apparatus 101#1 (step S1913). If the value read from the communication apparatus 101#0 coincides with the received value (step S1913: YES), the tentative execution is successful and the communication apparatus 101#0 copies into the shared data area, the data of the process under execution, saved in the area related to the process (step S1914). After the copying, the communication apparatus 101#0 discards the execution state saved in a different area (step S1915). After the discarding, the communication apparatus 101#0 continues execution of the process (step S1916) and goes to the operation at step S1901.

If the value read from the communication apparatus 101#0 does not coincide with the received value (step S1913: NO), the tentative execution has failed and the communication apparatus 101#0 discards the data of the process under execution, saved in the area related to the process (step S1917). The communication apparatus 101#0 returns to the saved execution state (step S1918), resumes execution of the process (step S1919), and goes to the operation at step S1901.

FIG. 19C is a flowchart of the distributed process when connection is cut off. If the connection is not continued (step S1902: NO), the communication apparatus 101#0 determines whether a termination request for the distributed processing has been detected (step S1920). If the termination request has been detected (step S1920: YES), the communication apparatus 101#0 terminates the distributed processing. If the termination request has not been detected (step S1920: NO), the communication apparatus 101#0 determines whether reconnection has been achieved (step S1921). If reconnection has not been achieved (step S1921: NO), the communication apparatus 101#0 determines whether memory access has been detected (step S1922).

If memory access has not been detected (step S1922: NO), the communication apparatus 101#0 goes to the operation at step S1920. If memory access has been detected (step S1922: YES), the communication apparatus 101#0 determines the type of access (step S1923). If the type of access is a read access to data specific to a process of the communication apparatus 101#0 (step S1923: (1)), the communication apparatus 101#0 reads a memory of the communication apparatus 101#0 (step S1924) and goes to the operation at step S1920.

If a type of access is a write access to data specific to process of the communication apparatus 101#0 (step S1923: (2)), the communication apparatus 101#0 performs writing and then records the write access into the I/O log 1401#0 (step S1925). After the recording, the communication apparatus 101#0 goes to the operation at step S1920.

If the type of access is a read access to data specific to a process of the other apparatus (step S1923: (3)), the communication apparatus 101#0 determines whether another executable process is present (step S1926). If another executable process exists (step S1926: YES), the communication apparatus 101#0 makes the shift to the executable process (step S1927) and goes to the operation at step S1920.

FIG. 19D is a flowchart of the distributed processing when reconnection is achieved after connection is cut off. If no other executable process is present (step S1926: NO), the communication apparatus 101#0 performs reconnection (step S1928). For example, the communication apparatus 101#0 may perform the reconnection after a given period or may perform the reconnection depending on a request from a user.

After performing the reconnection, the communication apparatus 101#0 is shifted to the low-power mode by the OS 203#0 (step S1929) and makes the transition to a reconnection waiting state. After the state transition, the communication apparatus 101#0 determines whether reconnection has been achieved (step S1930). If reconnection has not been achieved (step S1930: NO), the communication apparatus 101#0 executes the operation at step S1930 after a given period. If reconnection has been achieved (step S1930: YES), the communication apparatus 101#0 cancels the low-power mode and shifts to the normal mode (step S1931).

After shifting to the normal mode or if reconnection has been achieved (step S1921: YES), the communication apparatus 101#0 determines whether the I/O log 1401#0 exists (step S1932). The I/O log 1401#0 is generated by executing the operation at step S1925. If the I/O log 1401#0 exists (step S1932: YES), the communication apparatus 101#0 transmits the I/O log 1401#0 to the communication apparatus 101#1 (step S1933). For example, the communication apparatus 101#0 transmits the event ID "7" depicted in FIG. 8 and the I/O log 1401#0 and the communication apparatus 101#1 receives the event ID "7" to recognize that the I/O log is received.

After the transmission of the I/O log 1401#0 or if the I/O log 1401#0 does not exist (step S1932: NO), the communication apparatus 101#0 reads the I/O log 1401#1 from the connected communication apparatus 101#1 and establishes coherency (step S1934). For example, the communication apparatus 101#0 receives the event ID "7" to recognize that the I/O log is received and makes an update at a corresponding location of the data 202#1_0 with the value of the I/O log 1401#1 and thereby, establishes coherency of the data 202#1_0. After establishing coherency, the communication apparatus 101#0 resumes execution of the process (step S1935) and goes to the operation at step S1901.

As described, according to the communication apparatus, the communication method, and the communication program of the second embodiment, the communication apparatus of the first embodiment further transmits a write result in a memory of the apparatus due to a process to the other apparatus to cause the other apparatus to establish coherency. As a result, memory contents of multiple communication apparatuses are maintained in a consistent state.

If the communication state changes from the cutoff state to the connected state, the communication apparatus according to the second embodiment transmits to the other apparatus, a write result in a memory of the apparatus due to a process executed during the cutoff state and thereby, causes the other apparatus to establish coherency. As a result, since the communication apparatus can continue processing until access is made to data generated by a connected terminal even if communication is temporarily cut off, reductions in throughput of the communication apparatus can be prevented. Since the I/O log for shared data is created, the communication apparatus can resume the processing from the time point of the I/O log at the time of reconnection and therefore, the performance during execution can further be ensured.

If a read request to a memory of the other apparatus is issued from a process, the communication apparatus according to the second embodiment may continue the process by referring to a value of the memory already written in the apparatus while requesting a value of the memory from the other apparatus. As a result, the communication apparatus can perform the tentative execution by using the value already written in the apparatus. When the tentative execution is successful, the process can be executed without waiting for the reception of the value of the memory from the other apparatus and therefore, the processing can be accelerated.

If a coherency request is received from the other apparatus, the communication apparatus according to the second embodiment may perform writing into the memory of the apparatus as a read result of the memory of the other apparatus, thereby enabling the communication apparatus to maintain a consistent state for the read result of the memory of the other apparatus already written in the communication apparatus. Therefore, the tentative execution is likely to succeed.

After the communication state is cut off, the communication apparatus according to the second embodiment may suspend a process if the communication apparatus reads the memory of the other apparatus, and may cancel the suspension of the process if the communication state is reconnected. As a result, since the processing capacity required during the cutoff of the communication state is lowered in the communication apparatus, a power saving effect can be produced by achieving a reduction in clock frequency, etc.

The communication method described in the first and the second embodiments may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The communication apparatus, the communication method, and the communication program enable the elimination of overhead due to file formation and deployment processing arising when communication is processed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus comprising a processor configured to:

access memory of the communication apparatus;

communicate with a second apparatus;
execute a process;
detect an access request generated by the communication apparatus;
transmit a connection request to the second apparatus according to a request from the executed process;
set addresses for accessing the second apparatus, the addresses corresponding to addresses that are included in a response to the connection request and provided to the communication apparatus by the second apparatus;
determine whether an address of access targeted data indicated in the detected access request is one of the set addresses for accessing the second apparatus; and
perform control for selecting and executing based on a determination result, any one among a process of accessing the memory of the communication apparatus based on the access request and a process of communicating with the second apparatus based on the access request.

2. The communication apparatus according to claim 1, the processor configured to execute a process, wherein
the processor detects a write result in the memory of the communication apparatus, corresponding to a write request generated by the processor as the access request, and
the processor upon detecting the write result in the memory of the communication apparatus, performs control for transmitting to the second apparatus, a coherency request based on the write result.

3. The communication apparatus according to claim 2, wherein
the processor detects a communication state between the communication apparatus and the second apparatus, and
the processor upon detecting that the communication state transitions from a cutoff state to a connected state, performs control for transmitting to the second apparatus, a coherency request based on the write result that is consequent to access of the memory of the communication apparatus during the cutoff state.

4. The communication apparatus according to claim 1, the processor configured to execute a process, wherein
the processor upon determining that a read request generated by the processor as the access request is not to an address allocated to the memory of the communication apparatus, communicates with the second apparatus based on the read request,
the processor writes into the memory of the communication apparatus, a read result corresponding to the read request, and
the processor executes the process by using the read result written into the memory of the communication apparatus.

5. The communication apparatus according to claim 4, wherein
the processor upon determining that the read request is not to an address allocated to the memory of the communication apparatus and is newly issued, executes the process by using the read result in the memory of the communication apparatus until a new read result is written for the newly issued read request.

6. The communication apparatus according to claim 5, wherein
the processor upon receiving a coherency request from the second apparatus, performs control for writing, as the read result, into the memory of the communication apparatus.

7. The communication apparatus according to claim 4, wherein
the processor detects a communication state between the communication apparatus and the second apparatus,
the processor upon detecting that the communication state is cut off and determining that the access request is not to an address allocated to the memory of the communication apparatus, suspends execution of the process, and upon subsequently detecting that the communication state is connected, cancels suspension of the execution of the process.

8. A method of controlling access to memory of the communication apparatus and communication with a second apparatus, the method comprising:
executing a process;
detecting an access request generated by the communication apparatus;
transmitting a connection request to the second apparatus according to a request from the executed process;
setting addresses for accessing the second apparatus, the addresses corresponding to addresses that are included in a response to the connection request and provided to the communication apparatus by the second apparatus;
determining whether an address of access targeted data indicated in the detected access request is one of the set addresses for accessing the second apparatus; and
performing control for selecting and executing based on a determination result, any one among a process of accessing the memory of the communication apparatus based on the access request and a process of communicating with the second apparatus based on the access request.

9. A non-transitory computer-readable recording medium storing a program that causes a processor of a first apparatus that is capable of controlling access to memory of the first apparatus and communication with a second apparatus that is different from the first apparatus, to execute a control process comprising:
executing a process;
detecting an access request generated by the first apparatus;
transmitting a connection request to the second apparatus according to a request from the executed process;
setting addresses for accessing the second apparatus, the addresses corresponding to addresses that are included in a response to the connection request and provided to the communication apparatus by the second apparatus;
determining whether an address of access targeted data indicated in the detected access request one of the set addresses for accessing the second apparatus; and
performing control for selecting and executing based on a determination result, any one among a process of accessing the memory of the first apparatus based on the access request and a process of communicating with the second apparatus based on the access request.

* * * * *